US012650720B2

(12) United States Patent
Hu et al.

(10) Patent No.: US 12,650,720 B2
(45) Date of Patent: Jun. 9, 2026

(54) SLEEP/WAKE-UP METHOD, SYSTEM, AND APPARATUS

(71) Applicant: Yinwang Intelligent Technologies Co., Ltd., Shenzhen (CN)

(72) Inventors: Guojie Hu, Shenzhen (CN); Fu Zhao, Shenzhen (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 31 days.

(21) Appl. No.: 18/799,394

(22) Filed: Aug. 9, 2024

(65) Prior Publication Data

US 2024/0402787 A1 Dec. 5, 2024

Related U.S. Application Data

(63) Continuation of application No. PCT/CN2023/075039, filed on Feb. 8, 2023.

(30) Foreign Application Priority Data

Feb. 10, 2022 (CN) .......................... 202210125226.9

(51) Int. Cl.
*G06F 1/3206* (2019.01)
*H04L 67/12* (2022.01)

(52) U.S. Cl.
CPC ............ *G06F 1/3206* (2013.01); *H04L 67/12* (2013.01)

(58) Field of Classification Search
CPC .................................. G06F 1/3206; H04L 67/12
See application file for complete search history.

(56) References Cited

U.S. PATENT DOCUMENTS

| | | | | |
|---|---|---|---|---|
| 2002/0162038 | A1* | 10/2002 | Bullman | ................. H04L 12/12 |
| | | | | 713/323 |
| 2015/0212562 | A1* | 7/2015 | Guichard | ................ H04L 12/12 |
| | | | | 713/310 |
| 2021/0235243 | A1 | 7/2021 | Cai et al. | |
| 2022/0038303 | A1* | 2/2022 | Park | .................. H04W 52/0245 |
| 2022/0170991 | A1* | 6/2022 | Kim | ...................... B60R 16/005 |
| 2024/0351520 | A1* | 10/2024 | Otsu | ...................... B60R 16/023 |

FOREIGN PATENT DOCUMENTS

| | | |
|---|---|---|
| CN | 110758289 A | 2/2020 |
| JP | 2012222452 A | 11/2012 |
| JP | 2016201740 A | 12/2016 |
| JP | 2021083059 A | 5/2021 |
| JP | 2021132336 A | 9/2021 |

* cited by examiner

Primary Examiner — Nimesh G Patel
(74) Attorney, Agent, or Firm — Conley Rose, P.C.

(57) ABSTRACT

A sleep/wake-up method includes converting at least one first sleep/wake-up signal into at least one second sleep/wake-up signal, determining at least one static control target based on the at least one second sleep/wake-up signal, where the static control target indicates a function of the first sleep/wake-up signal, determining at least one sleep/wake-up action based on the at least one static control target, where the sleep/wake-up action is used to wake up at least one in-vehicle object in at least one vehicle integration unit or control at least one in-vehicle object in the at least one vehicle integration unit to enter a sleep state, and performing the at least one sleep/wake-up action.

20 Claims, 17 Drawing Sheets

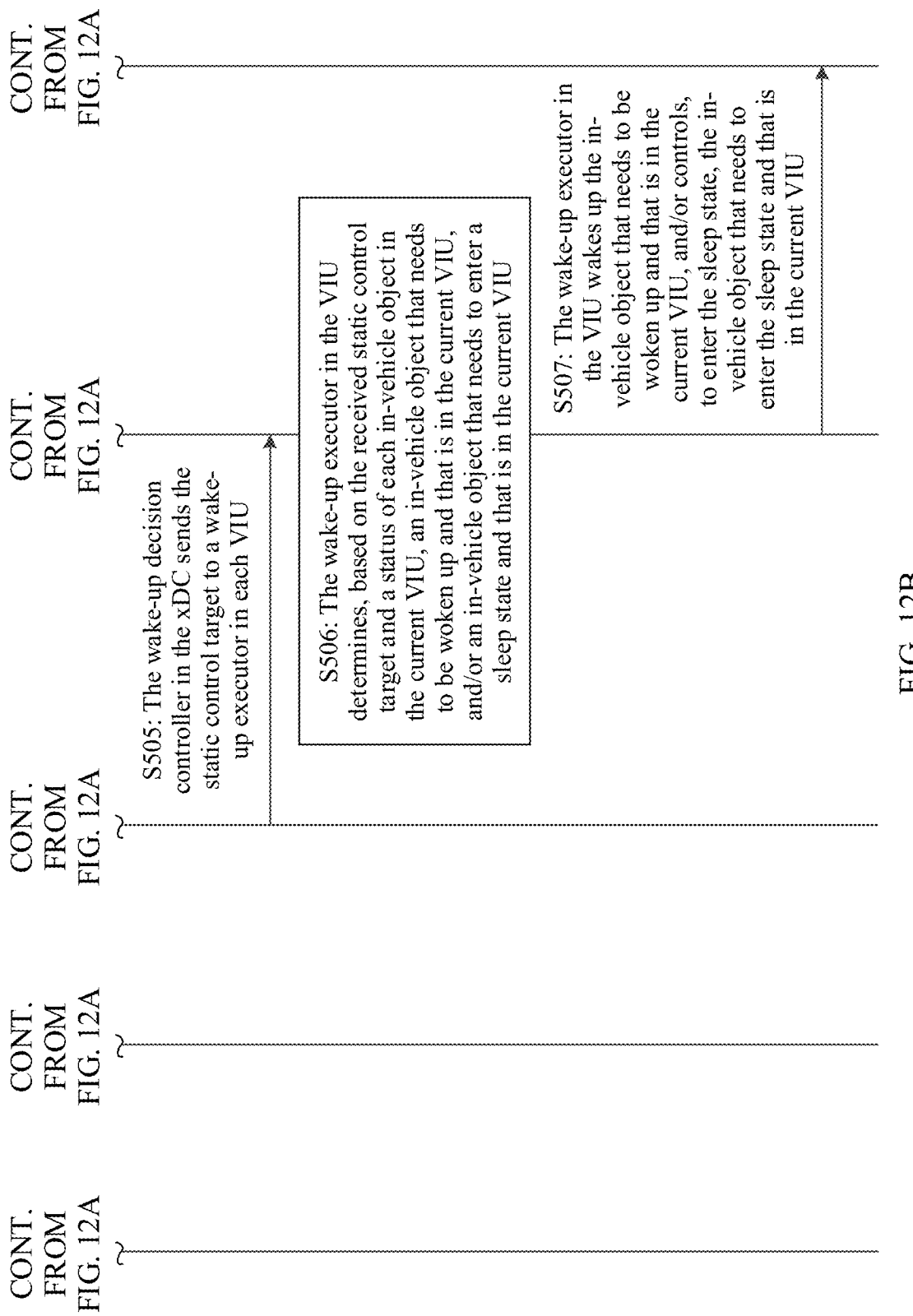

CONT. FROM FIG. 12A

CONT. FROM FIG. 12A

S505: The wake-up decision controller in the xDC sends the static control target to a wake-up executor in each VIU S506: The wake-up executor in the VIU determines, based on the received static control target and a status of each in-vehicle object in the current VIU, an in-vehicle object that needs to be woken up and that is in the current VIU, and/or an in-vehicle object that needs to enter a sleep state and that is in the current VIU S507: The wake-up executor in the VIU wakes up the in-vehicle object that needs to be woken up and that is in the current VIU, and/or controls, to enter the sleep state, the in-vehicle object that needs to enter the sleep state and that is in the current VIU

CONT. FROM FIG. 12A

CONT. FROM FIG. 12A

CONT. FROM FIG. 12A

FIG. 12B

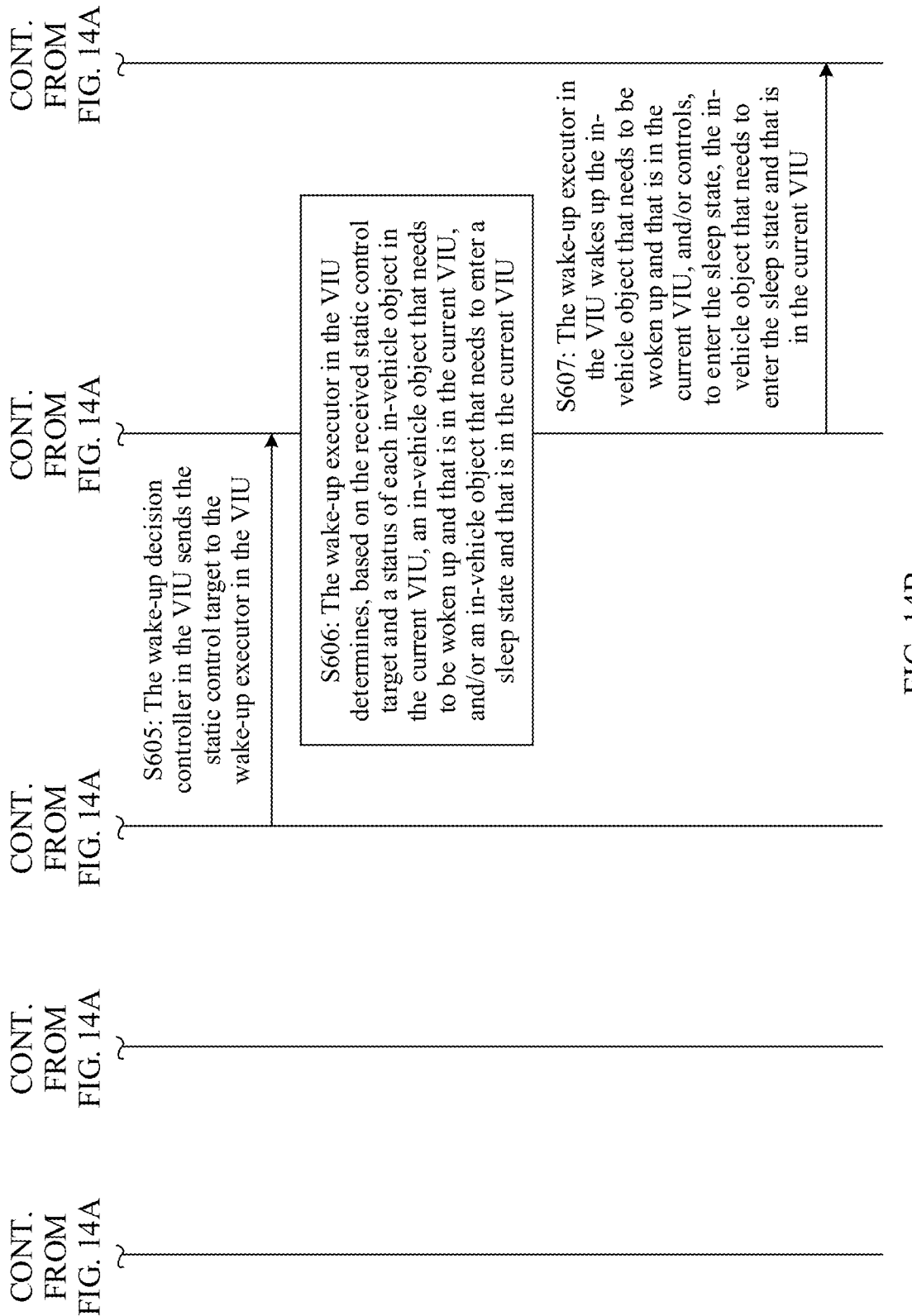

CONT.
FROM
FIG. 14A

CONT.
FROM
FIG. 14A

CONT.
FROM
FIG. 14A

CONT.
FROM
FIG. 14A

CONT.
FROM
FIG. 14A

S605: The wake-up decision controller in the VIU sends the static control target to the wake-up executor in the VIU S606: The wake-up executor in the VIU determines, based on the received static control target and a status of each in-vehicle object in the current VIU, an in-vehicle object that needs to be woken up and that is in the current VIU, and/or an in-vehicle object that needs to enter a sleep state and that is in the current VIU S607: The wake-up executor in the VIU wakes up the in-vehicle object that needs to be woken up and that is in the current VIU, and/or controls, to enter the sleep state, the in-vehicle object that needs to enter the sleep state and that is in the current VIU

FIG. 14B

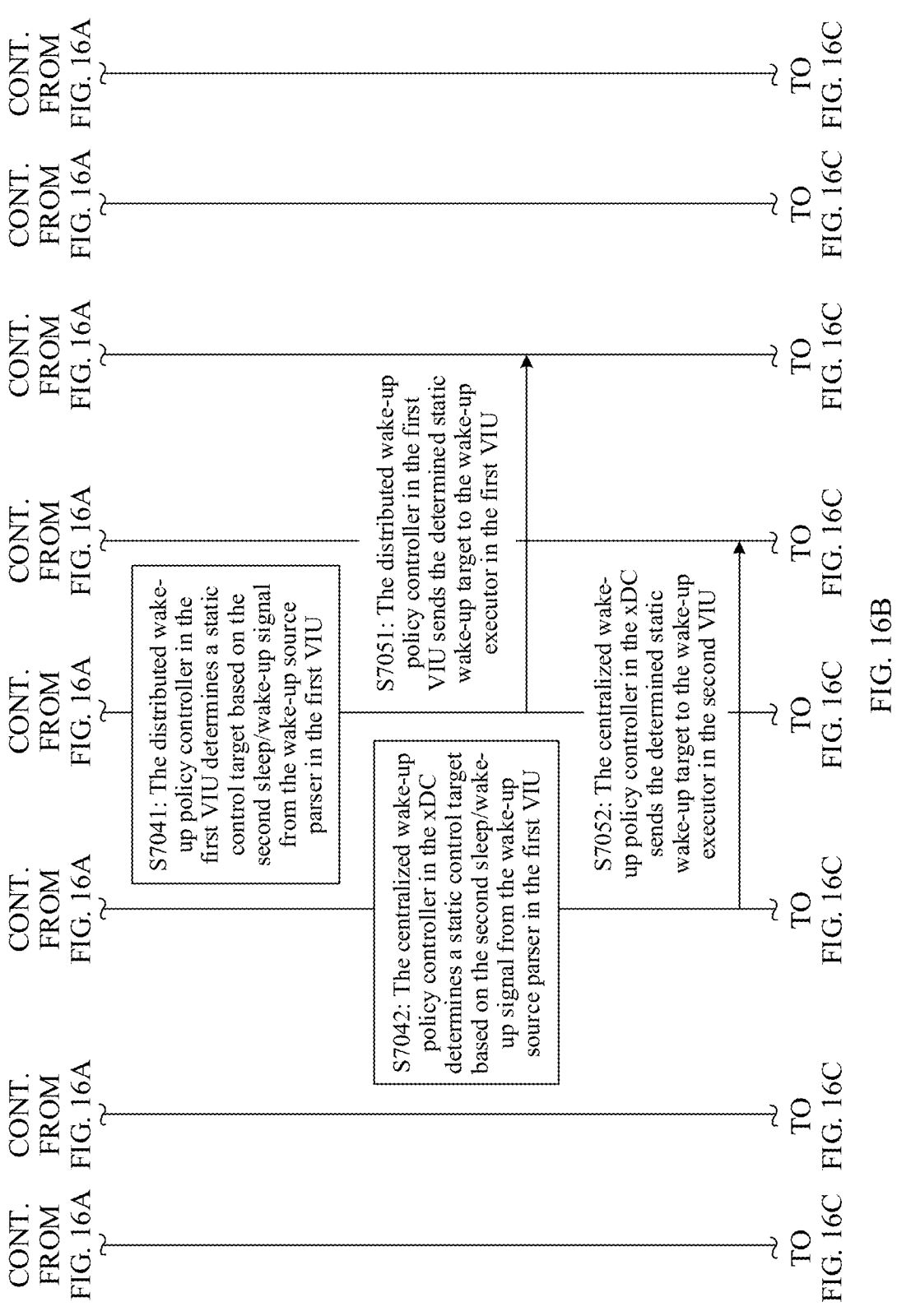

S7041: The distributed wake-up policy controller in the first VIU determines a static control target based on the second sleep/wake-up signal from the wake-up source parser in the first VIU S7051: The distributed wake-up policy controller in the first VIU sends the determined static wake-up target to the wake-up executor in the first VIU S7042: The centralized wake-up policy controller in the xDC determines a static control target based on the second sleep/wake-up signal from the wake-up source parser in the first VIU S7052: The centralized wake-up policy controller in the xDC sends the determined static wake-up target to the wake-up executor in the second VIU

FIG. 16B

SLEEP/WAKE-UP METHOD, SYSTEM, AND APPARATUS

CROSS-REFERENCE TO RELATED APPLICATIONS

This is a continuation of International Patent Application No. PCT/CN2023/075039 filed on Feb. 8, 2023, which claims priority to Chinese Patent Application No. 202210125226.9 filed on Feb. 10, 2022. The disclosures of the aforementioned applications are hereby incorporated by reference in their entireties.

TECHNICAL FIELD

This disclosure relates to the field of intelligent vehicles, and in particular, to a sleep/wake-up method, system, and apparatus.

BACKGROUND

With rapid development of intelligent connected vehicles, a sharp increase in an amount of vehicle information and a requirement for vehicle intelligence jointly promote upgrade and evolution of an electrical/electronic (E/E) architecture of the vehicles. From a perspective of an electronic control unit (ECU), the E/E architecture of the vehicles has undergone three generations of evolution.

The first generation is a distributed E/E architecture. In this architecture, one function corresponds to one ECU. The second generation is a centralized E/E architecture. In this architecture, original single-function ECUs are integrated into a controller based on a function type. For example, the ECUs are integrated into a powertrain domain, a chassis domain, a body domain, a driving domain, and a cockpit domain. The third generation is a centralized E/E architecture. In this architecture, function domains are further centralized to form one or more central computing units. In addition, function domains in the second generation are further centralized to form a zonal controller. The centralized E/E architecture may also be referred to as a communication and computation architecture (CCA).

A sleep/wake-up solution used in the distributed E/E architecture is as follows. In a vehicle sleep state, when a specific function is activated, a vehicle network needs to be woken up. The vehicle network can enter a sleep state only after all network nodes meet a sleep condition. This sleep/wake-up solution affects vehicle power consumption and shortens a stationary storage period of the vehicle. In addition, in this sleep/wake-up solution, the network nodes affect each other. Once the network nodes cannot normally enter a sleep state due to an abnormal factor such as software vulnerability or hardware failure, it is difficult to locate an abnormal network node.

A sleep/wake-up solution used in the centralized E/E architecture is as follows: sleep/wake-up requirements of ECUs in different network segments connected to a central gateway (CGW) are used as a determining condition, to independently enable the different network segments to enter a sleep state or wake up the different network segments. FIG. 1 is a diagram of an example network topology of a centralized E/E architecture. As shown in FIG. 1, a CGW of the centralized E/E architecture is connected to three controller area networks (CAN): a CAN 1, a CAN 2, and a CAN 3. Three ECUs: an ECU 1, an ECU 2, and an ECU 3 are connected to the CAN 1. Three ECUs: an ECU 4, an ECU 5, and an ECU 6 are connected to the CAN 2.

Three ECUs: an ECU 7, an ECU 8, and an ECU 9 are connected to the CAN 3. In a vehicle sleep state, when detecting that the ECU 1 on the CAN 1 is woken up, the CGW determines whether an associated ECU that has function interaction with the ECU 1 exists on the CAN 2. If the associated ECU exists, the CGW wakes up the CAN 2 and the associated ECU on the CAN 2. When determining that all the ECUs in the CAN 1 send a sleep request, and all associated ECUs that have function interaction with all the ECUs in the CAN 1 also send a sleep request, the CGW controls the CAN 1 to enter a sleep state. A sleep/wake-up scenario in which there are a plurality of CGWs, and mutual impact between the CGWs in a sleep/wake-up process are not considered in this sleep/wake-up solution. In addition, sleep/wake-up manners based on an Ethernet bus, a Local Interconnect Network (LIN) bus, hardwiring, and the like are not considered in this sleep/wake-up solution.

In the communication and computation architecture, the ECU implements interaction of a plurality of networks by using a plurality of vehicle integration units (VIUs). Therefore, none of the foregoing sleep/wake-up solutions is applicable to the communication and computation architecture. Considering that a large quantity of in-vehicle E/E architectures already change from a distributed E/E architecture and a centralized E/E architecture to communication and computation architectures, how to implement sleep/wake-up control in the communication and computation architecture becomes an urgent problem to be resolved.

SUMMARY

In view of this, a sleep/wake-up method, system, and apparatus are provided, to implement sleep/wake-up control based on a communication and computation architecture.

According to a first aspect, an embodiment of this disclosure provides a sleep/wake-up method. The method includes converting at least one first sleep/wake-up signal into at least one second sleep/wake-up signal, where the first sleep/wake-up signal represents a sleep/wake-up signal generated in an in-vehicle network of a first vehicle model, and the second sleep/wake-up signal represents a unified sleep/wake-up signal into which sleep/wake-up signals that are generated in in-vehicle networks of different vehicle models and that have a same function are converted, determining at least one static control target based on the at least one second sleep/wake-up signal, where the static control target indicates a function of the first sleep/wake-up signal, determining at least one sleep/wake-up action based on the at least one static control target, where the sleep/wake-up action is used to wake up at least one in-vehicle object in at least one vehicle integration unit or control at least one in-vehicle object in the at least one vehicle integration unit to enter a sleep state, and performing the at least one sleep/wake-up action.

In a possible implementation, converting at least one first sleep/wake-up signal into at least one second sleep/wake-up signal includes determining, based on a first mapping relationship, a second sleep/wake-up signal corresponding to any one of the at least one first sleep/wake-up signal, where the first mapping relationship represents a mapping relationship between the sleep/wake-up signal generated in the in-vehicle network of the first vehicle model and the unified sleep/wake-up signal.

In a possible implementation, determining at least one static control target based on the at least one second sleep/wake-up signal includes determining, based on a second mapping relationship, a static control target corresponding to any one of the at least one second sleep/wake-up signal, where the second mapping relationship represents a mapping relationship between the unified sleep/wake-up signal and an in-vehicle object, and merging a static control target corresponding to each second sleep/wake-up signal, to obtain the at least one static control target.

In a possible implementation, determining at least one sleep/wake-up action based on the at least one static control target includes determining, based on a third mapping relationship, at least one vehicle integration unit corresponding to any one of the at least one static control target, and an in-vehicle object on which sleep/wake-up control needs to be performed and that is in each determined vehicle integration unit, where the third mapping relationship represents a mapping relationship between a static control target, a vehicle integration unit, and an in-vehicle object on which sleep/wake-up control needs to be performed, and determining the at least one sleep/wake-up action based on whether the in-vehicle object on which sleep/wake-up control needs to be performed is currently in an awake state or a sleep state.

In a possible implementation, the first sleep/wake-up signal includes a first signal used to wake up an in-vehicle object and/or a second signal used to control an in-vehicle object to enter a sleep state, and the method further includes, when a network management packet or a service packet is received, or a first level change is detected, determining that the first signal is obtained, or when no network management packet or no service packet is received within a preset time, or a second level change is detected, determining that the second signal is obtained.

According to a second aspect, an embodiment of this disclosure provides a sleep/wake-up system. The sleep/wake-up system includes a wake-up source parser, a wake-up policy controller, and a wake-up executor.

The wake-up source parser is configured to convert at least one first sleep/wake-up signal into at least one second sleep/wake-up signal, send the at least one second sleep/wake-up signal to the wake-up policy controller, and convert the at least one first sleep/wake-up signal into the at least one second sleep/wake-up signal, where the first sleep/wake-up signal represents a sleep/wake-up signal generated in an in-vehicle network of a first vehicle model, and the second sleep/wake-up signal represents a unified sleep/wake-up signal into which sleep/wake-up signals that are generated in in-vehicle networks of different vehicle models and that have a same function are converted.

The wake-up policy controller is configured to determine at least one static control target based on the at least one second sleep/wake-up signal, and send the at least one static control target to the wake-up executor, where the static control target indicates a function of the first sleep/wake-up signal.

The wake-up executor is configured to determine at least one sleep/wake-up action based on the at least one static control target, and perform the at least one sleep/wake-up action, where the sleep/wake-up action is used to wake up at least one in-vehicle object in at least one vehicle integration unit or control at least one in-vehicle object in the at least one vehicle integration unit to enter a sleep state.

In a possible implementation, the wake-up source parser and the wake-up executor are deployed in a vehicle integration unit, and the wake-up policy controller is deployed in a domain controller.

In a possible implementation, the wake-up source parser, the wake-up policy controller, and the wake-up executor are deployed in a vehicle integration unit.

In a possible implementation, the wake-up policy controller includes a distributed wake-up policy controller and a centralized wake-up policy controller, the wake-up source parser, the wake-up executor, and the distributed wake-up policy controller are deployed in a vehicle integration unit, and the centralized wake-up policy controller is deployed in a domain controller.

In a possible implementation, the wake-up source parser is further configured to determining, based on a first mapping relationship, a second sleep/wake-up signal corresponding to any one of the at least one first sleep/wake-up signal, where the first mapping relationship represents a mapping relationship between the sleep/wake-up signal generated in the in-vehicle network of the first vehicle model and the unified sleep/wake-up signal.

In a possible implementation, the wake-up policy controller is further configured to determining, based on a second mapping relationship, a static control target corresponding to any one of the at least one second sleep/wake-up signal, where the second mapping relationship represents a mapping relationship between the unified sleep/wake-up signal and an in-vehicle object, and merging a static control target corresponding to each second sleep/wake-up signal, to obtain the at least one static control target.

In a possible implementation, the wake-up executor is further configured to determining, based on a third mapping relationship, at least one vehicle integration unit corresponding to any one of the at least one static control target, and an in-vehicle object on which sleep/wake-up control needs to be performed and that is in each determined vehicle integration unit, where the third mapping relationship represents a mapping relationship between a static control target, a vehicle integration unit, and an in-vehicle object on which sleep/wake-up control needs to be performed, and determining the at least one sleep/wake-up action based on whether the in-vehicle object on which sleep/wake-up control needs to be performed is currently in an awake state or a sleep state.

In a possible implementation, the first sleep/wake-up signal includes a first signal used to wake up an in-vehicle object and/or a second signal used to control an in-vehicle object to enter a sleep state, and the sleep/wake-up system further includes a wake-up source.

The wake-up source is configured to, when a network management packet or a service packet is received, or a first level change is detected, determine that the first signal is obtained, or when no network management packet or no service packet is received within a preset time, or a second level change is detected, determine that the second signal is obtained.

According to a third aspect, an embodiment of this disclosure provides a sleep/wake-up apparatus. The apparatus includes a conversion module configured to convert at least one first sleep/wake-up signal into at least one second sleep/wake-up signal, where the first sleep/wake-up signal represents a sleep/wake-up signal generated in an in-vehicle network of a first vehicle model, and the second sleep/wake-up signal represents a unified sleep/wake-up signal into which sleep/wake-up signals that are generated in in-vehicle networks of different vehicle models and that have a same function are converted, a first determining module configured to determine at least one static control target based on the at least one second sleep/wake-up signal, where the static control target indicates a function of the first sleep/wake-up signal, a second determining module configured to determine at least one sleep/wake-up action based on the at least one static control target, where the sleep/wake-up action is used to wake up at least one in-vehicle object in at least one vehicle integration unit or control at least one in-vehicle object in the at least one vehicle integration unit to enter a sleep state, and an execution module configured to perform the at least one sleep/wake-up action.

In a possible implementation, the conversion module is further configured to determining, based on a first mapping relationship, a second sleep/wake-up signal corresponding to any one of the at least one first sleep/wake-up signal, where the first mapping relationship represents a mapping relationship between the sleep/wake-up signal generated in the in-vehicle network of the first vehicle model and the unified sleep/wake-up signal.

In a possible implementation, the first determining module is further configured to determining, based on a second mapping relationship, a static control target corresponding to any one of the at least one second sleep/wake-up signal, where the second mapping relationship represents a mapping relationship between the unified sleep/wake-up signal and an in-vehicle object, and merging a static control target corresponding to each second sleep/wake-up signal, to obtain the at least one static control target.

In a possible implementation, the second determining module is further configured to determining, based on a third mapping relationship, at least one vehicle integration unit corresponding to any one of the at least one static control target, and an in-vehicle object on which sleep/wake-up control needs to be performed and that is in each determined vehicle integration unit, where the third mapping relationship represents a mapping relationship between a static control target, a vehicle integration unit, and an in-vehicle object on which sleep/wake-up control needs to be performed, and determining the at least one sleep/wake-up action based on whether the in-vehicle object on which sleep/wake-up control needs to be performed is currently in an awake state or a sleep state.

In a possible implementation, the first sleep/wake-up signal includes a first signal used to wake up an in-vehicle object and/or a second signal used to control an in-vehicle object to enter a sleep state, and the apparatus further includes a third determining module configured to, when a network management packet or a service packet is received, or a first level change is detected, determine that the first signal is obtained, or a fourth determining module configured to, when no network management packet or no service packet is received within a preset time, or a second level change is detected, determine that the second signal is obtained.

According to a fourth aspect, an embodiment of this disclosure provides a sleep/wake-up apparatus. The sleep/wake-up apparatus may perform the sleep/wake-up method according to one or more of the first aspect or the plurality of possible implementations of the first aspect.

According to a fifth aspect, an embodiment of this disclosure provides a computer program product. The computer program product includes computer-readable code or a non-volatile computer-readable storage medium carrying computer-readable code. When the computer-readable code is run in an electronic device, a processor in the electronic device performs the sleep/wake-up method according to one or more of the first aspect or the plurality of possible implementations of the first aspect.

In embodiments of this disclosure, sleep/wake-up signals generated in in-vehicle networks of different vehicle models may be converted into a unified sleep/wake-up signal, and a unified static control target is obtained, to wake up an in-vehicle object in a vehicle integration unit or enable an in-vehicle object in the vehicle integration unit to enter a sleep state. Therefore, sleep/wake-up control in a communication and computation architecture is implemented by using software.

These aspects and other aspects of this disclosure are more concise and more comprehensive in descriptions of the following (a plurality of) embodiments.

BRIEF DESCRIPTION OF DRAWINGS

The accompanying drawings included in this specification and constituting a part of this specification and this specification jointly show some example embodiments, features, and aspects of this disclosure, and are intended to explain the principles of this disclosure.

FIG. 12A and FIG. 12B are a flowchart of interaction of a sleep/wake-up method according to an embodiment of this disclosure;

FIG. 14A and FIG. 14B are a flowchart of interaction of a sleep/wake-up method according to an embodiment of this disclosure;

FIG. 16A, FIG. 16B, and FIG. 16C are a flowchart of interaction of a sleep/wake-up method according to an embodiment of this disclosure;

DESCRIPTION OF EMBODIMENTS

Figure 1:
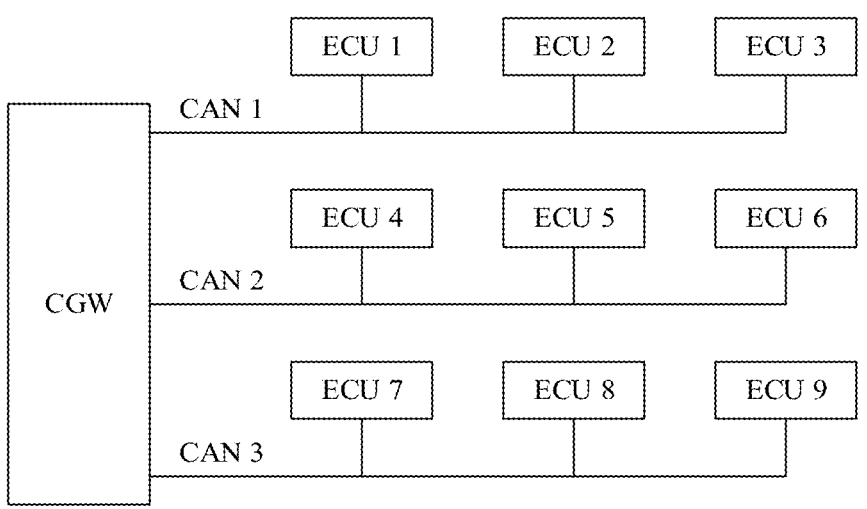
FIG. 1 is a diagram of an example network topology of a centralized E/E architecture.

The following describes various example embodiments, features, and aspects of this disclosure in detail with reference to the accompanying drawings. Identical reference numerals in the accompanying drawings indicate elements that have same or similar functions. Although various aspects of embodiments are illustrated in the accompanying drawings, the accompanying drawings are not necessarily drawn in proportion unless otherwise specified.

The specific term "example" herein means "used as an example, embodiment or illustration". Any embodiment described as an "example" is not necessarily explained as being superior or better than other embodiments.

In addition, to better describe this disclosure, numerous specific details are given in the following specific implementations. A person skilled in the art should understand that this disclosure can also be implemented without some specific details. In some instances, methods, means, elements and circuits that are well-known to a person skilled in the art are not described in detail, so that the subject matter of this disclosure is highlighted.

In a communication and computation architecture, ECUs of a vehicle are distributed in a plurality of zones, and one VIU is deployed in each zone to manage the ECUs in the zone. The VIUs are interconnected through the high-speed Ethernet, to implement high-speed communication of the vehicle. In embodiments of this disclosure, the VIU may have one or more of the following plurality of functions: an electronic control function, to be specific, the VIU is configured to implement an electronic control function provided by some or all of the ECUs in the foregoing vehicle components, a function that is the same as that of a gateway, to be specific, the VIU may further have some or all functions that are the same as those of the gateway, for example, a protocol conversion function, a protocol encapsulation and forwarding function, and a data format conversion function, and a function of processing data across vehicle components and parts, to be specific, processing, calculating, and the like data obtained from executors of a plurality of vehicle components. It should be noted that the foregoing is merely an example of a function of the VIU, and is not intended to limit the VIU. The VIU may have more or fewer functions than those shown above.

In the communication and computation architecture, there is an independent domain controller (DC) in each function domain of the vehicle. For example, the DCs in the vehicle may include an autonomous driving domain controller (e.g., advanced driver-assistance systems (ADAS) \AD domain controller (ADC)), a cockpit domain controller (CDC), a vehicle domain controller (VDC), and the like.

The ADC may be configured to provide services for vehicle components that implement a self-driving function. The vehicle components that implement the self-driving function include a monocular camera, a binocular camera, a millimeter-wave radar, a lidar, an ultrasonic radar, and the like. It should be noted that a function of the ADC may be implemented by a mobile data center (MDC). The CDC may be configured to provide services for vehicle components in a cockpit domain. The vehicle components in the cockpit domain include a head-up display (HUD), an instrument display, a radio, navigation, a camera, and the like. The VDC may be configured to provide services for vehicle components in a body domain and vehicle components in a chassis domain. The vehicle components in the body domain include a door and window lifting controller, electric rear view mirror, an air conditioner, a central door lock, and the like. The vehicle components in the chassis domain include vehicle components in a braking system, vehicle components in a steering system, and vehicle components in an acceleration system, for example, an accelerator.

In embodiments of this disclosure, the VDC, the MDC, and the CDC may be integrated in terms of logical functions based on a requirement. In an example, the VDC and the MDC are integrated. That is, a vehicle control service and a self-driving service are integrated, and the CDC is retained. In another example, the MDC and the CDC are integrated. That is, the self-driving and an entertainment control module are integrated, and the VDC is retained. In still another example, the VDC and the CDC are integrated. That is, the vehicle control service and the entertainment control module are integrated, and the MDC is retained. In yet another example, the VDC, the MDC, and the CDC are integrated. That is, the vehicle control service and the self-driving service are integrated. In this case, the VDC, the MDC, and the CDC are integrated into a central computer in the architecture. A correspondence between functions and components no longer exists, and the VIU is instructed by the central computer as required. In embodiments of this disclosure, for ease of description and understanding, in embodiments of this disclosure, an xDC may be used to replace the VDC, the MDC, the CDC, or a component obtained by integrating two or three of the VDC, the MDC and the CDC.

Figure 2:
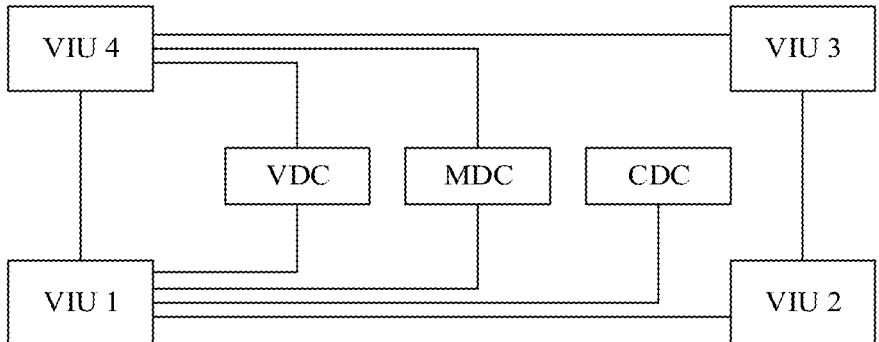
FIG. 2, FIG. 3, and FIG. 4 each are a diagram of an example network topology of ring networking of a communication and computation architecture.
Figure 3:
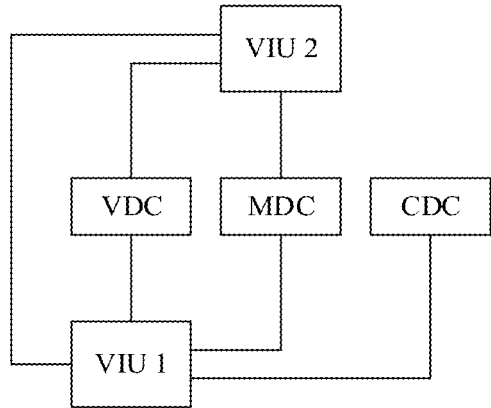
Figure 4:
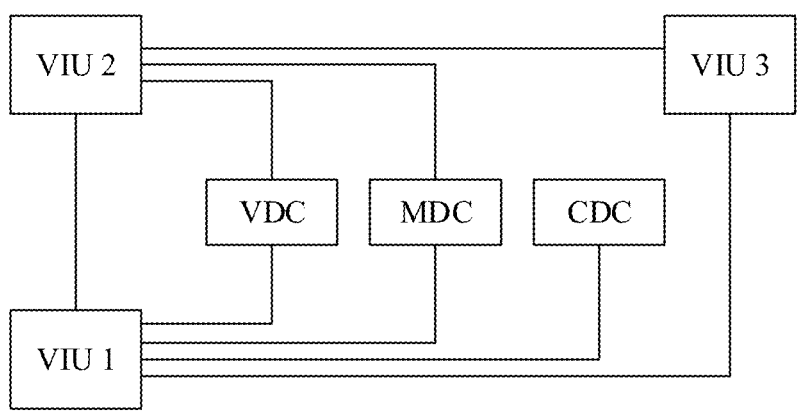
Figure 5:
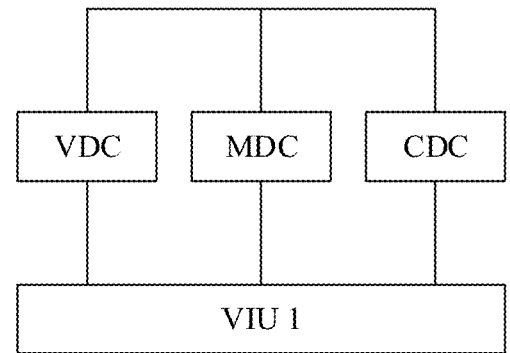
FIG. 5 and FIG. 6 each are a diagram of an example network topology of star networking of a communication and computation architecture.
Figure 6:
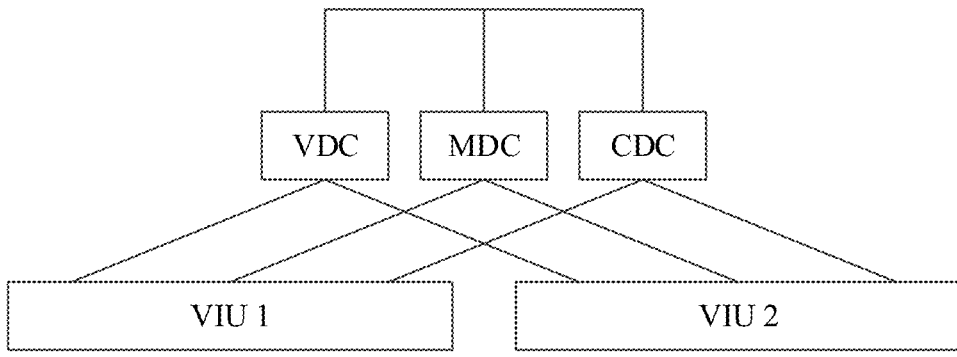

In consideration of requirements of different vehicle models, the communication and computation architecture may support different networking forms of the VIU and the xDC, for example, ring networking and star networking. FIG. 2 to FIG. 4 each are a diagram of an example network topology of ring networking of a communication and computation architecture. FIG. 5 and FIG. 6 each are a diagram of an example network topology of star networking of a communication and computation architecture. VIU 1, VIU 2, VIU 3, and VIU 4 in FIG. 2 to FIG. 6 are VIUs. Functions of the VIU, the VDC, the MDC, and the CDC are described above. Details are not described herein again. It may be understood that the communication and computation architecture shown in FIG. 2 to FIG. 6 is merely an example of the communication and computation architecture, and is not intended to limit the communication and computation architecture. The communication and computation architecture may further include more or fewer VIUs, or may have another networking form. Details are not described herein again.

A signal-oriented communication manner is an interaction manner of the vehicle. Point-to-point data transmission is performed between the ECUs through a CAN bus and an LIN bus. The communication manner is determined before the vehicle is delivered. When an architecture of the vehicle evolves to the communication and computation architecture, most computing power is centralized in the xDC. Interaction between software and hardware in the vehicle is no longer point-to-point, and there is a large amount of collaboration between the hardware. Any adjustment will affect the entire network, causing inconvenience for an update. The signal-oriented communication manner is no longer suitable for the communication and computation architecture.

A service-oriented architecture (SOA) effectively resolves a coupling problem between the software and the hardware, and is a software architecture that adapts to centralized evolution of an E/E architecture. Under a concept of the SOA, when the vehicle needs to implement a function, a related service A "subscribes to" a service from a service B. After receiving subscription information, the service A "pushes" the service to the service B, and then the related service implements the function. The SOA makes software service-oriented. Upgrade and adjustment of a service do not affect the entire network, thereby improving scalability of vehicle functions. Different services can invoke different software combinations, and different service combinations can implement different functions. This greatly enhances reusability of the software.

In the communication and computation architecture, the VIU and xDC form a core network of an in-vehicle network, and a CAN access, an Ethernet access, an LIN access, and a general-purpose input/output (GPIO) access that are connected to the VIU form an access network of the in-vehicle network. In embodiments of this disclosure, to maintain compatibility with an existing ECU, a sleep/wake-up manner such as a CAN or a LIN is still used for the access network. To ensure flexibility of a sleep/wake-up solution, a sleep/wake-up manner provided in embodiments of this disclosure is used for the core network. The sleep/wake-up solution provided in embodiments of this disclosure can simplify development of a vehicle manufacturer, and maximize platformization of the sleep/wake-up solution. The sleep/wake-up solution provided in embodiments of this disclosure may be loaded to an in-vehicle device in a form of software (early or later) and sold.

Figure 7:
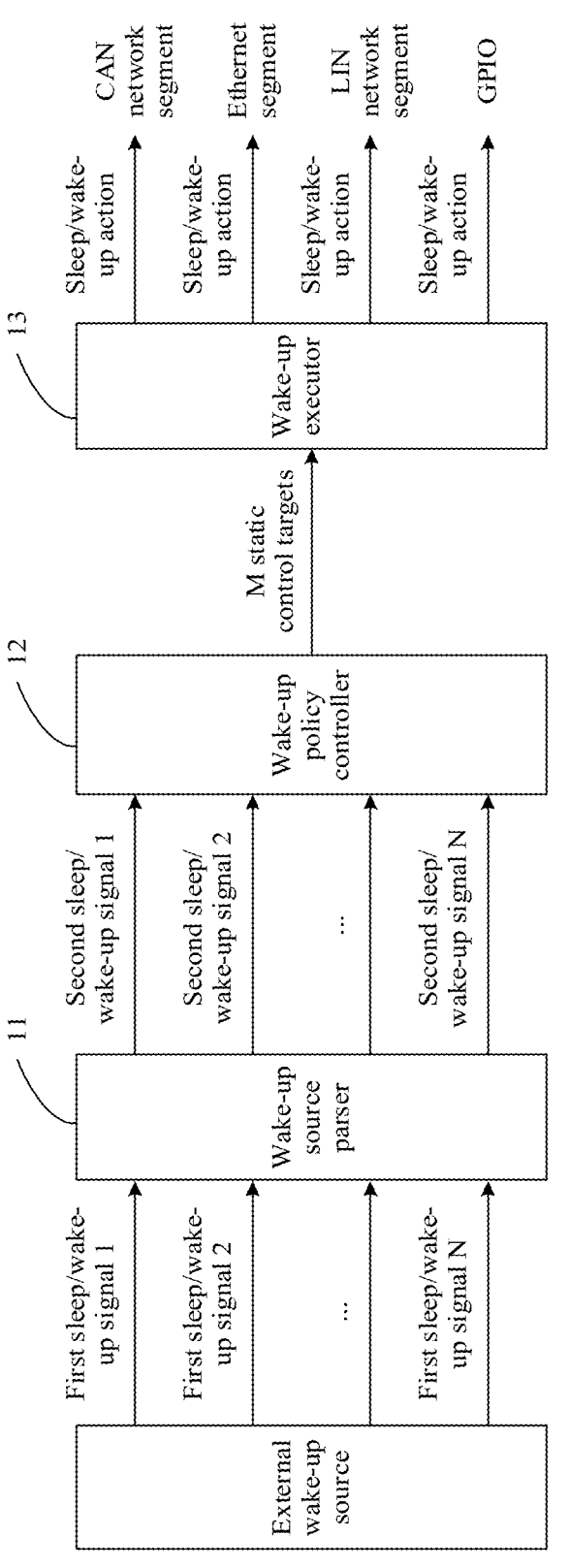
FIG. 7 is a schematic diagram of an architecture of a sleep/wake-up system according to an embodiment of this disclosure.

FIG. 7 is a schematic diagram of an architecture of a sleep/wake-up system according to an embodiment of this disclosure. As shown in FIG. 7, the sleep/wake-up system includes a wake-up source parser 11, a wake-up policy controller 12, and a wake-up executor 13.

The wake-up source parser 11 may be configured to convert at least one first sleep/wake-up signal into at least one second sleep/wake-up signal. The first sleep/wake-up signal may represent a sleep/wake-up signal generated in an in-vehicle network of a first vehicle model, and the first vehicle model may represent any vehicle model. It may be understood that sleep/wake-up signals that are generated in in-vehicle networks of different vehicle models and that have a same function are different. For example, an in-vehicle network of a vehicle model A (that is, the first vehicle model) implements a function of waking up all low-voltage power supplies of the vehicle by inputting a high level (that is, a sleep/wake-up signal generated in the in-vehicle network of the vehicle model A) by using a personal identification number (PIN), and an in-vehicle network of a vehicle model B (that is, the first vehicle model) implements a function of waking up all low-voltage power supplies of the vehicle by using a CAN packet with KeyON=1 (that is, a sleep/wake-up signal generated in the in-vehicle network of the vehicle model B). The second sleep/wake-up signal may represent a unified sleep/wake-up signal into which sleep/wake-up signals that are generated in in-vehicle networks of different vehicle models and that have a same function are converted. For example, the wake-up source parser 11 may convert the high level input by using the PIN into "KL15=1", or may convert the CAN packet with KeyON=1 into "KL15=1". It may be learned that first sleep/wake-up signals that are generated in in-vehicle networks of different vehicle models and have a same function may be converted into a unified sleep/wake-up signal after being parsed by the wake-up source parser 11.

In an example, the first sleep/wake-up signal includes but is not limited to: a CAN packet, an Ethernet interface packet, a LIN interface packet, a GPIO packet, and the like. The packet includes but is not limited to a network management packet, a service packet, and the like. A type of the packet is not limited in embodiments of this disclosure.

In a possible implementation, the first sleep/wake-up signal includes a first signal used to wake up an in-vehicle object and/or a second signal used to control an in-vehicle object to enter a sleep state. When the wake-up source parser 11 receives a network management packet or a service packet, or detects a first level change, it may be determined that the first signal is obtained, or when the wake-up source parser 11 does not receive a network management packet or a service packet within a preset time, or detects a second level change, it may be determined that the second signal is obtained. The preset time may be set based on a requirement, for example, may be set to 30 seconds or 1 minute. This is not limited in this disclosure.

The first level change may indicate a level change used to wake up the in-vehicle object, and the second level change may indicate a level change used to control the in-vehicle object to enter a sleep state. The first level change may be a change from a low level to a high level, or may be a change from a high level to a low level. The second level change may be a change from a low level to a high level, or may be a change from a high level to a low level. In embodiments of this disclosure, it is possible to set in advance interfaces or lines on which a detected change from a low level to a high level is the first level change, interfaces or lines on which a detected change from a low level to a high level is the second level change, interfaces or lines on which a detected change from a high level to a low level is the first level change, and interfaces or lines on which a detected change from a high level to a low level is the second level change. In this way, when detecting that a level on an interface or a line changes (from a low level to a high level, or from a high level to a low level), the wake-up source parser 11 may determine, based on preset content, whether the level change is the first level change or the second level change, to determine whether the first signal or the second signal is obtained.

As shown in FIG. 7, when an external wake-up source (for example, a CAN, a LIN, an Ethernet interface, or a GPIO) starts to send a network management packet or a service packet, or stops sending a network management packet or a service packet, the wake-up source parser 11 receives N first sleep/wake-up signals that are collected. The wake-up source parser 11 separately converts the N first sleep/wake-up signals to obtain N second sleep/wake-up signals. N is an integer greater than or equal to 1, and N indicates a quantity of first sleep/wake-up signals.

The wake-up source parser 11 may send at least one second sleep/wake-up signal to the wake-up policy controller 12. A sending manner herein may be a CAN network management (CANNM) packet, a CAN application packet, a User Datagram Protocol (UDP) network management (UDPNM) packet, or a user-defined Internet Protocol (IP) protocol stack-based packet and a combination thereof. In this embodiment of this disclosure, a manner in which the wake-up source parser 11 sends the second sleep/wake-up signal to the wake-up policy controller 12 is not limited.

The wake-up policy controller 12 may be configured to determine at least one static control target (or referred to as a sleep/wake-up mode, a wake-up mode, a sleep mode, or the like) based on the at least one second sleep/wake-up signal. The static control target may indicate a function of the first sleep/wake-up signal. The static control target herein includes a static wake-up target to be woken up, and/or a static sleep target to enter a sleep state. For example, the static control target may be a combination of a CAN network segment, a LIN network segment, an Ethernet segment, or an ECU required for direct current charging, wake-up of unlocking with a BLUETOOTH key, or vehicle wake-up, or a combination of a CAN network segment, a LIN network segment, an Ethernet segment, or an ECU required for entering a sleep state, or the like.

As shown in FIG. 7, after receiving the N second sleep/wake-up signals, the wake-up policy controller 12 outputs M static control targets. M is an integer greater than or equal to 1, and M indicates a quantity of static control targets. It may be understood that, although each second sleep/wake-up signal corresponds to one static control target, considering that some static control targets may be merged, a quantity of static control targets output by the wake-up policy controller 12 may be different from a quantity of received second sleep/wake-up signals. For example, if a second sleep/wake-up signal A corresponds to a static control target A, a second sleep/wake-up signal B corresponds to a static control target B, and a second sleep/wake-up signal C corresponds to a static control target C, a static control target finally output by the wake-up policy controller 12 is a union set of the static control target A, the static control target B, and the static control target C. If the static control target A, the static control target B, and the static control target C can be merged, final output results of the wake-up policy controller 12 need to be merged, to prevent the wake-up executor 13 from performing unnecessary processing. For example, if the static control target A is CAN 1 wake-up, the static control target B is CAN 2 wake-up, and the static control target C is vehicle wake-up, the wake-up policy controller 12 only needs to output vehicle wake-up, and there is no need to output the CAN 1 wake-up, the CAN 2 wake-up, and the vehicle wake-up.

The wake-up policy controller 12 may send the at least one static control target to the wake-up executor 13. A sending manner herein may be a CANNM packet, a CAN application packet, a UDPNM packet, or a user-defined IP protocol stack-based packet and a combination thereof. In this embodiment of this disclosure, a manner in which the wake-up policy controller 12 sends the static control target to the wake-up executor 13 is not limited. In a possible implementation, the wake-up policy controller 12 may send the static control target to the wake-up executor 13 in a unicast or broadcast manner.

The wake-up executor 13 may be configured to determine at least one sleep/wake-up action based on the at least one static control target. The sleep/wake-up action may be used to wake up at least one in-vehicle object (for example, a CAN, a LIN, or an ECU) in the at least one VIU, or control at least one in-vehicle object in the at least one vehicle integration unit to enter a sleep state. When the first sleep/wake-up signal is the first signal, the sleep/wake-up action obtained based on the first sleep/wake-up signal may be used to wake up at least one in-vehicle object in at least one vehicle integration unit. When the first sleep/wake-up signal is the second signal, the sleep/wake-up action obtained based on the first sleep/wake-up signal may be used to control at least one in-vehicle object in the at least one vehicle integration unit to enter a sleep state.

The wake-up executor 13 may perform the determined at least one sleep/wake-up action. In an example, performing a sleep/wake-up action includes but is not limited to sending CANNM to an ECU, and waking up the ECU through a specific interface.

The sleep/wake-up system provided in this embodiment of this disclosure may be used in an intelligent vehicle, a new energy vehicle, another vehicle, or the like. The new energy vehicle includes a pure electric vehicle, an extended-range electric vehicle, a hybrid vehicle, a fuel cell vehicle, another new energy vehicle, or the like. The other vehicle includes a gasoline vehicle, a diesel vehicle, or the like.

According to the sleep/wake-up system provided in this embodiment of this disclosure, sleep/wake-up signals generated in in-vehicle networks of different vehicle models may be converted into a unified sleep/wake-up signal, and a unified static control target is obtained, to wake up an in-vehicle object in a vehicle integration unit or enable an in-vehicle object in the vehicle integration unit to enter a sleep state. Therefore, sleep/wake-up control in a communication and computation architecture is implemented by using software.

Figure 8:
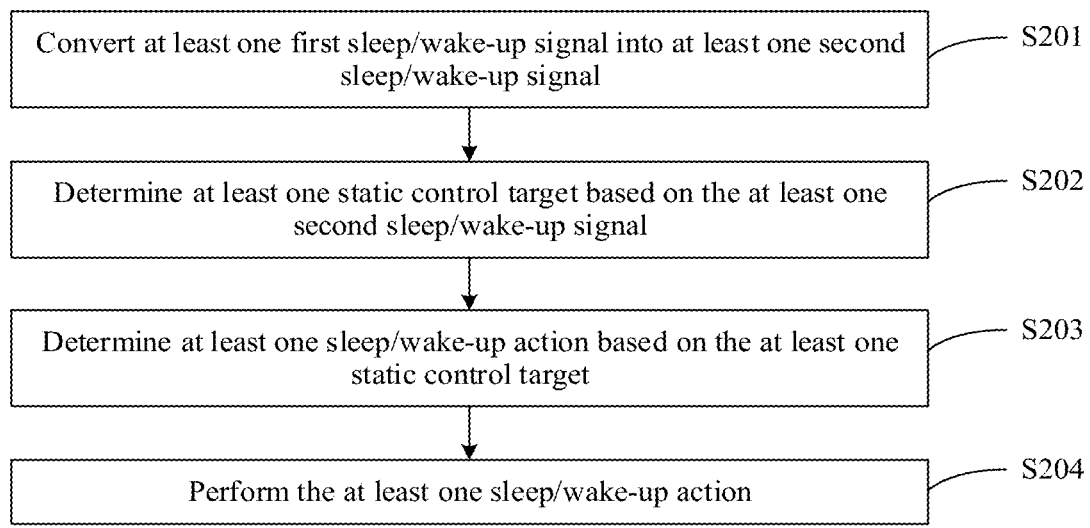
FIG. 8 is a flowchart of a sleep/wake-up method according to an embodiment of this disclosure.

FIG. 8 is a flowchart of a sleep/wake-up method according to an embodiment of this disclosure. The method may be applied to a sleep/wake-up system, for example, the sleep/wake-up system shown in FIG. 7. As shown in FIG. 8, the method may include the following steps.

Step S201: Convert at least one first sleep/wake-up signal into at least one second sleep/wake-up signal.

The first sleep/wake-up signal represents a sleep/wake-up signal generated in an in-vehicle network of a first vehicle model. The second sleep/wake-up signal represents a unified sleep/wake-up signal into which sleep/wake-up signals that are generated in in-vehicle networks of different vehicle models and that have a same function are converted.

In an example, the first sleep/wake-up signal may include a first signal used to wake up an in-vehicle object. When a network management packet or a service packet is received, or a first level change is detected, the sleep/wake-up system may determine that the first signal is obtained. When the sleep/wake-up system determines that the first signal is obtained, it indicates that one or more in-vehicle objects in one or more vehicle integration units need to be woken up.

In another example, the first sleep/wake-up signal may include a second signal used to control an in-vehicle object to enter a sleep state. When no network management packet or no service packet is received within a preset time, or a second level change is detected, the sleep/wake-up system determines that the second signal is obtained. When the sleep/wake-up system determines that the second signal is obtained, it indicates that one or more in-vehicle objects in one or more vehicle integration units need to be controlled to enter a sleep state.

Figure 9:
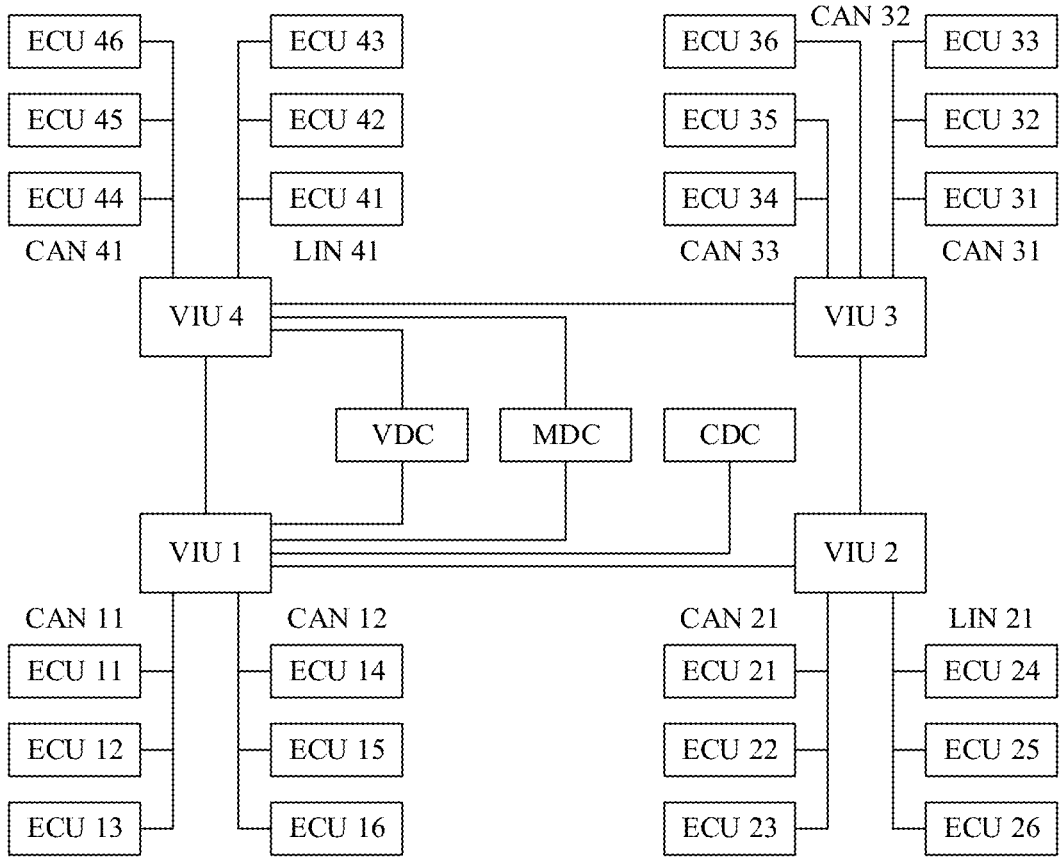
FIG. 9 is a schematic diagram of an example network topology of a communication and computation architecture.

For ease of description, a network topology structure shown in FIG. 9 is used as an example for description in this embodiment of this disclosure. FIG. 9 is a schematic diagram of an example network topology of a communication and computation architecture. As shown in FIG. 9, the communication and computation architecture includes four VIUs (a VIU 1, a VIU 2, a VIU 3, and a VIU 4), a VDC, an MDC, and a CDC. As shown in FIG. 9, the VIU 1 includes a CAN 11 and a CAN 12, where an ECU 11, an ECU 12, and an ECU 13 are connected to the CAN 11, and an ECU 14, an ECU 15, and an ECU 16 are connected to the CAN 12. The VIU 2 includes a CAN 21 and a LIN 21, where an ECU 21, an ECU 22, and an ECU 23 are connected to the CAN 21, and an ECU 24, an ECU 25, and an ECU 26 are connected to the LIN 21. The VIU 3 includes a CAN 31, a CAN 32, and a CAN 33, where an ECU 31, an ECU 32, and an ECU 33 are connected to the CAN 31, an ECU 34 and an ECU 35 are connected to the CAN 33, and an ECU 36 is connected to the CAN 32. The VIU 4 includes a CAN 41 and a LIN 41, where an ECU 41, an ECU 42, and an ECU 43 are connected to the LIN 41, and an ECU 44, an ECU 45, and an ECU 46 are connected to the CAN 41. The VIU 1, VIU 2, VIU 3, and VIU 4 are vehicle integration units. The CAN 11, CAN 12, LIN 21, and the like are in-vehicle objects. The ECU 11, ECU 12, ECU 13, and the like are also in-vehicle objects. The first signal may be used to wake up the one or more in-vehicle objects in the one or more vehicle integration units. For example, the first signal may be used to wake up the CAN 11 in the VIU 1, or may be used to wake up the ECU 14 and the ECU 15 that are connected to the CAN 12 in the VIU 1. The second signal may be used to control the one or more in-vehicle objects in the one or more vehicle integration units to enter a sleep state. For example, the second signal may be used to control the CAN 41 and the LIN 41 in the VIU 4 to enter a sleep state, or used to control, to enter a sleep state, the ECU 44 connected to the CAN 41.

In a possible implementation, step S201 may include determining, based on a first mapping relationship, a second sleep/wake-up signal corresponding to any one of the at least one first sleep/wake-up signal, where the first mapping relationship represents a mapping relationship between the sleep/wake-up signal generated in the in-vehicle network of the first vehicle model and the unified sleep/wake-up signal.

Table 1 shows an example of the first mapping relationship. As shown in Table 1, based on FIG. 9, when J4-35 of the VIU 3 detects a high level, the sleep/wake-up system may determine that a first sleep/wake-up signal is obtained. In this case, the sleep/wake-up system may convert, based on the first mapping relationship, the first sleep/wake-up signal into a second sleep/wake-up signal "A+ direct current charging". When the CAN 21 has no network management packet, the sleep/wake-up system may determine that a first sleep/wake-up signal is obtained. In this case, the sleep/wake-up system may convert, based on the first mapping relationship, the first sleep/wake-up signal into a second sleep/wake-up signal "The CAN 21 requests to enter a sleep state". In a possible implementation, a name of the second sleep/wake-up signal may indicate a function of the second sleep/wake-up signal. Considering that the first sleep/wake-up signal before conversion corresponds to the second sleep/wake-up signal obtained through conversion, and implemented functions are the same, the name of the second sleep/wake-up signal further indicates a function of the first sleep/wake-up signal.

TABLE 1

| No. | First sleep/wake-up signal | Second sleep/wake-up signal | |
|---|---|---|---|
| | | Identifier | Name |
| 1 | J4-25 of a VIU 3 detects a high level | 1 | A+ direct current charging |
| 2 | A VIU 1 receives a passive entry and passive start (PEPS) network management (PEPSNM) packet | 2 | Unlocking with a BLUETOOTH key |
| 3 | J3-11 of the VIU 3 detects a low level | 3 | Opening a left front door |
| 4 | J5-16 of a VIU 1 detects a high level | 4 | KL15 |
| 5 | A CAN 21 has no network management packet | 5 | The CAN 21 requests to enter a sleep state |

As shown in Table 1, in this embodiment of this disclosure, a unique identifier may be set for each second sleep/wake-up signal. In this way, the identifier of the second sleep/wake-up signal is transferred instead of the name of the second sleep/wake-up signal, to improve efficiency.

The sleep/wake-up system shown in FIG. 7 is used as an example. The wake-up source parser 11 converts the first sleep/wake-up signal into the second sleep/wake-up signal, and sends the second sleep/wake-up signal to the wake-up policy controller 12 for subsequent processing. In this embodiment of this disclosure, an interface 1 represents an interface between the wake-up source parser 11 and the wake-up policy controller 12, and the wake-up source parser 11 may send the second sleep/wake-up signal to the wake-up policy controller 12 through the interface 1.

Table 2 shows an example of the interface 1. As shown in Table 2, a name corresponding to a second sleep/wake-up signal with an identifier being 2 is defined in the interface 1 as "Unlocking with a BLUETOOTH key". Therefore, when the wake-up source parser 11 transfers the identifier 2 through the interface 1, the wake-up policy controller 12 may learn that a name of the second sleep/wake-up signal is "Unlocking with a BLUETOOTH key".

TABLE 2

| No. | Identifier of the second sleep/wake-up signal | Name of the second sleep/wake-up signal |
|---|---|---|
| 1 | 2 | Unlocking with a BLUETOOTH key |
| 2 | 4 | KL15 |

In this embodiment of this disclosure, the first mapping relationship and the interface 1 may be set based on a requirement and historical experience.

Step S202: Determine at least one static control target based on the at least one second sleep/wake-up signal.

The static control target indicates the function of the first sleep/wake-up signal.

In a possible implementation, step S202 may include determining, based on a second mapping relationship, a static control target corresponding to any one of the at least one second sleep/wake-up signal, where the second mapping relationship represents a mapping relationship between the unified sleep/wake-up signal and an in-vehicle object, and merging a static control target corresponding to each second sleep/wake-up signal, to obtain the at least one static control target.

Table 3 shows an example of the second mapping relationship. As shown in Table 3, based on FIG. 9, when the sleep/wake-up system obtains a second sleep/wake-up signal with an identifier being 1, a static control target with an identifier being 1, a name being "direct current charging", and content being "CAN 41" may be obtained based on the second mapping relationship. The static control target indicates a function "A+ direct current charging". When the sleep/wake-up system obtains a second sleep/wake-up signal with an identifier being 2, a static control target with an identifier being 2, a name being "Wake-up of unlocking with a BLUETOOTH key", and content being "CAN 11, CAN 12, and CAN 31" may be obtained based on the second mapping relationship. The static control target indicates a function "Unlocking with a BLUETOOTH key".

TABLE 3

| | Second sleep/wake-up signal | | Static control target | | |
|---|---|---|---|---|---|
| No. | Identifier | Name | Identifier | Name | Content |
| 1 | 1 | A+ direct current charging | 1 | Direct current charging | CAN 41 |
| 2 | 2 | Unlocking with a BLUETOOTH key | 2 | Wake-up of unlocking with a BLUETOOTH key | CAN 11, CAN 12, and CAN 31 |
| 3 | 3 | Opening a left front door | 3 | Wake-up of the left front door | CAN 11 and CAN 41 |
| 4 | 4 | KL15 | 4 | Vehicle wake-up | Vehicle network wake-up |
| 5 | 5 | A CAN 21 requests to enter a sleep state | 5 | The CAN 21 enters a sleep state | CAN 21 |

As shown in Table 3, in this embodiment of this disclosure, a unique identifier may be set for each static control target based on a function indicated by each static control target, or a unique identifier may be set for each static control target based on a requirement. In this way, the identifier of the static control target is transferred instead of the name and the content of the static control target, to improve efficiency.

The sleep/wake-up system shown in FIG. 7 is used as an example. The wake-up policy controller 12 determines the static control target based on the second sleep/wake-up signal, and sends the static control target to the wake-up executor 13 for subsequent processing. In this embodiment of this disclosure, an interface 2 represents an interface between the wake-up policy controller 12 and the wake-up executor 13, and the wake-up policy controller 12 may send the static control target to the wake-up executor 13 through the interface 2.

Table 4 shows an example of the interface 2. As shown in Table 4, content corresponding to a static control target with an identifier being 1 is defined in the interface 2 as "CAN 41". Therefore, when the wake-up policy controller 12 transfers the identifier 1 through the interface 2, the wake-up executor 13 may learn that a name of the static control target is "direct current charging" and the content of the static control target is "CAN 41".

TABLE 4

| Identifier | Name | Content |
|---|---|---|
| 1 | Direct current charging | CAN 41 |
| 2 | Wake-up of unlocking with a BLUETOOTH key | CAN 11, CAN 12, and CAN 31 |
| 3 | Wake-up of a left front door | CAN 11 and CAN 41 |
| 4 | Vehicle wake-up | Vehicle network wake-up |
| 5 | A CAN 21 enters a sleep state | CAN 21 |

In this embodiment of this disclosure, the second mapping relationship and the interface 2 may be set based on a requirement and historical experience.

Step S203: Determine at least one sleep/wake-up action based on the at least one static control target.

The sleep/wake-up action is used to wake up at least one in-vehicle object in at least one vehicle integration unit or control at least one in-vehicle object in the at least one vehicle integration unit to enter a sleep state. It may be understood that, when the first sleep/wake-up signal is the first signal, a correspondingly obtained sleep/wake-up action is used to wake up at least one in-vehicle object in at least one vehicle integration unit. When the first sleep/wake-up signal is the second signal, a correspondingly obtained sleep/wake-up action is used to control at least one in-vehicle object in the at least one vehicle integration unit to enter a sleep state.

In a possible implementation, step S203 may include determining, based on a third mapping relationship, at least one vehicle integration unit corresponding to any one of the at least one static control target, and an in-vehicle object on which sleep/wake-up control needs to be performed and that is in each determined vehicle integration unit, where the third mapping relationship represents a mapping relationship between a static control target, a vehicle integration unit, and an in-vehicle object on which sleep/wake-up control needs to be performed, and determining the at least one sleep/wake-up action based on whether the in-vehicle object on which sleep/wake-up control needs to be performed is currently in an awake state or a sleep state.

Table 5 shows an example of the third mapping relationship. As shown in Table 5, based on FIG. 9, when the sleep/wake-up system obtains a static control target with an identifier being 1, a sleep/wake-up action with an identifier being 1, a vehicle integration unit being "VIU 4", and in-vehicle objects being the ECU 44 and the ECU 45 that are connected to the "CAN 41" may be obtained based on the third mapping relationship. The sleep/wake-up action is used to wake up the ECU 44 and the ECU 45 that are connected to the "CAN 41" and that are in the vehicle integration unit "VIU 4".

TABLE 5

| | | | | | Sleep/wake-up action | |
|---|---|---|---|---|---|---|
| | | Static control target | | | Vehicle integration | |
| No. | Identifier | Name | Content | Identifier | unit | In-vehicle object |
| 1 | 1 | Direct current charging | CAN 41 | 1 | VIU 4 | ECU 44 and ECU 45 that are connected to the CAN 41 |

TABLE 5-continued

| No. | Static control target Identifier | Name | Content | Sleep/wake-up action Identifier | Vehicle integration unit | In-vehicle object |
|---|---|---|---|---|---|---|
| 2 | 2 | Wake-up of unlocking with a BLUETOOTH key | CAN 11 CAN 12 CAN 31 | 1 | VIU 1 | ECU 11 and ECU 13 that are connected to the CAN 11 ECU 14, ECU 15, and ECU 16 that are connected to the CAN 12 |
| | | | | 2 | VIU 3 | ECU 31 connected to the CAN 31 |
| 3 | 3 | Wake-up of a left front door | CAN 11 CAN 41 | 1 | VIU 1 | ECU 11 and ECU 13 that are connected to the CAN 11 |
| | | | | 2 | VIU 4 | ECU 44 and ECU 45 that are connected to the CAN 41 |
| 4 | 4 | Vehicle wake-up | Vehicle network wake-up | 1 | VIU 1 | CAN 11 and CAN 12 |
| | | | | 2 | VIU 2 | CAN 21 and LIN 22 |
| | | | | 3 | VIU 3 | CAN 31, CAN 32, and CAN 33 |
| | | | | 4 | VIU 4 | CAN 41 and LIN 41 |
| 5 | 5 | The CAN 21 enters the sleep state | CAN 21 | 1 | VIU 2 | ECU 21, ECU 22, and ECU 23 that are connected to the CAN 21 |

In this embodiment of this disclosure, the third mapping relationship may be set based on a requirement and historical experience.

Step S204: Perform the at least one sleep/wake-up action.

The sleep/wake-up system may perform each sleep/wake-up action, to wake up the at least one in-vehicle object in the at least one vehicle integration unit or control the at least one in-vehicle object in the at least one vehicle integration unit to enter a sleep state.

According to the sleep/wake-up system provided in this embodiment of this disclosure, sleep/wake-up signals generated in in-vehicle networks of different vehicle models may be converted into a unified sleep/wake-up signal, and a unified static control target is obtained, to wake up an in-vehicle object in a vehicle integration unit or enable an in-vehicle object in the vehicle integration unit to enter a sleep state. Therefore, sleep/wake-up control in the communication and computation architecture is implemented by using software.

Figure 10A:
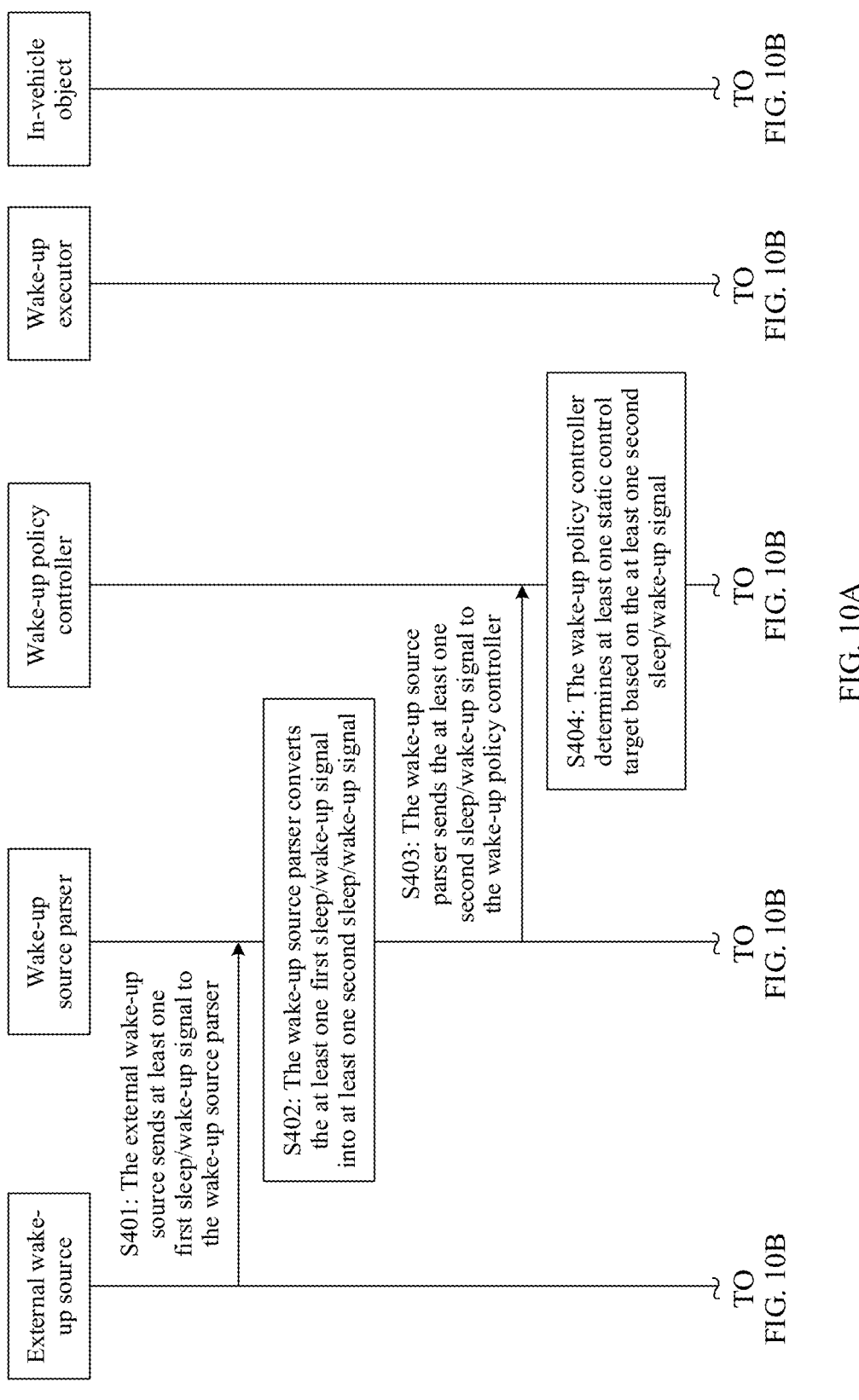
FIG. 10A and FIG. 10B are a flowchart of interaction of a sleep/wake-up method according to an embodiment of this disclosure.
Figure 10B:
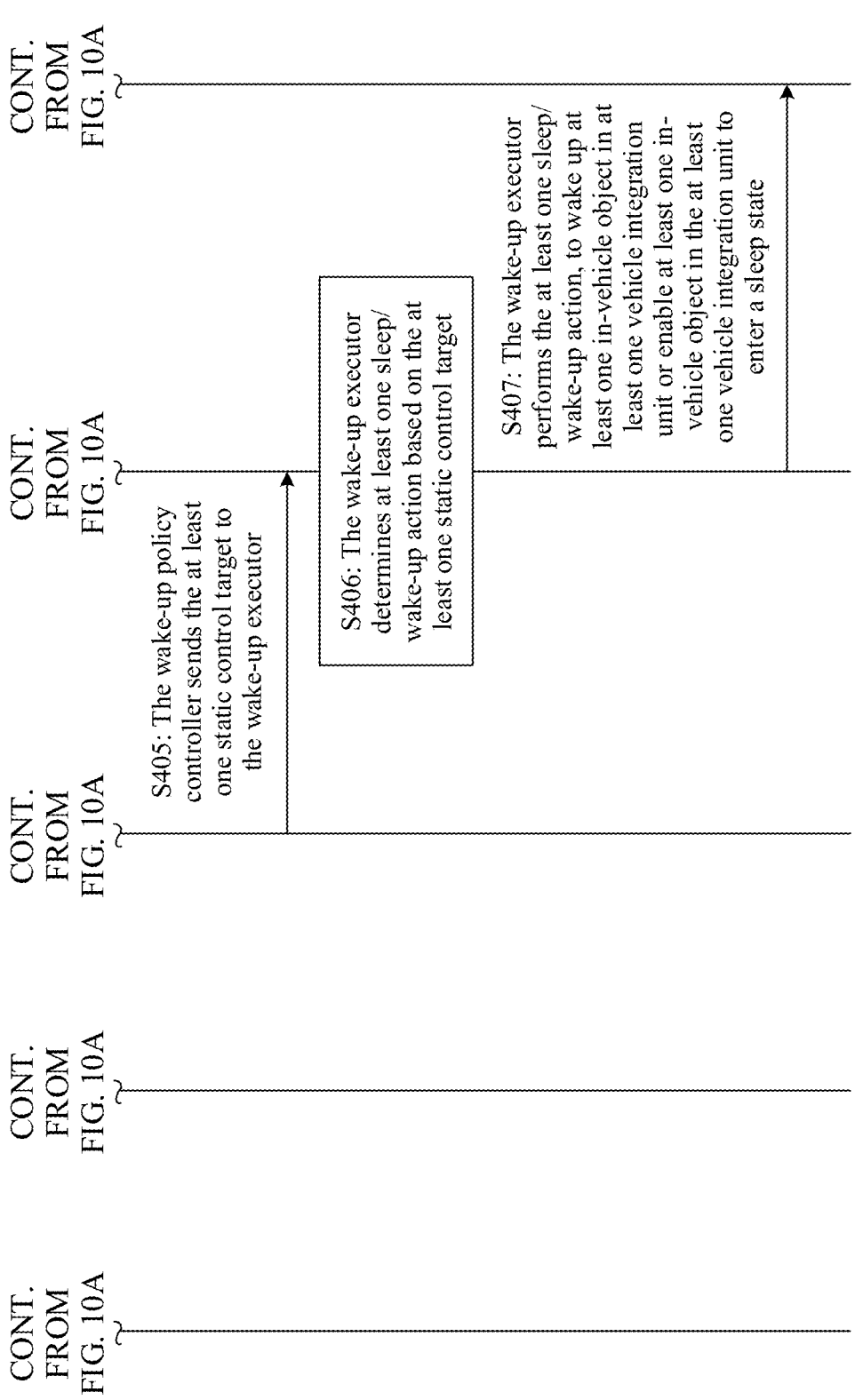

FIG. 10A and FIG. 10B are a flowchart of interaction of a sleep/wake-up method according to an embodiment of this disclosure. The method shown in FIG. 10A and FIG. 10B may be applied to the system shown in FIG. 7. As shown in FIG. 10A and FIG. 10B, the method may include the following steps.

Step S401: An external wake-up source sends at least one first sleep/wake-up signal to a wake-up source parser.

Step S402: The wake-up source parser converts the at least one first sleep/wake-up signal into at least one second sleep/wake-up signal.

Step S403: The wake-up source parser sends the at least one second sleep/wake-up signal to a wake-up policy controller.

Step S404: The wake-up policy controller determines at least one static control target based on the at least one second sleep/wake-up signal.

Step S405: The wake-up policy controller sends the at least one static control target to a wake-up executor.

Step S406: The wake-up executor determines at least one sleep/wake-up action based on the at least one static control target.

Step S407: The wake-up executor performs the at least one sleep/wake-up action, to wake up at least one in-vehicle object in at least one vehicle integration unit or enable at least one in-vehicle object in the at least one vehicle integration unit to enter a sleep state.

For step S401 to step S407, refer to step S201 to step S204. Details are not described herein again.

According to the sleep/wake-up method provided in this embodiment of this disclosure, sleep/wake-up signals generated in in-vehicle networks of different vehicle models may be converted into a unified sleep/wake-up signal, and a unified static control target is obtained, to wake up an in-vehicle object in a vehicle integration unit or enable an in-vehicle object in the vehicle integration unit to enter a sleep state. Therefore, sleep/wake-up control in a communication and computation architecture is implemented by using software.

In a possible implementation, the wake-up source parser and the wake-up executor in the sleep/wake-up system may be deployed in a vehicle integration unit, and the wake-up policy controller is deployed in a domain controller.

Figure 11:
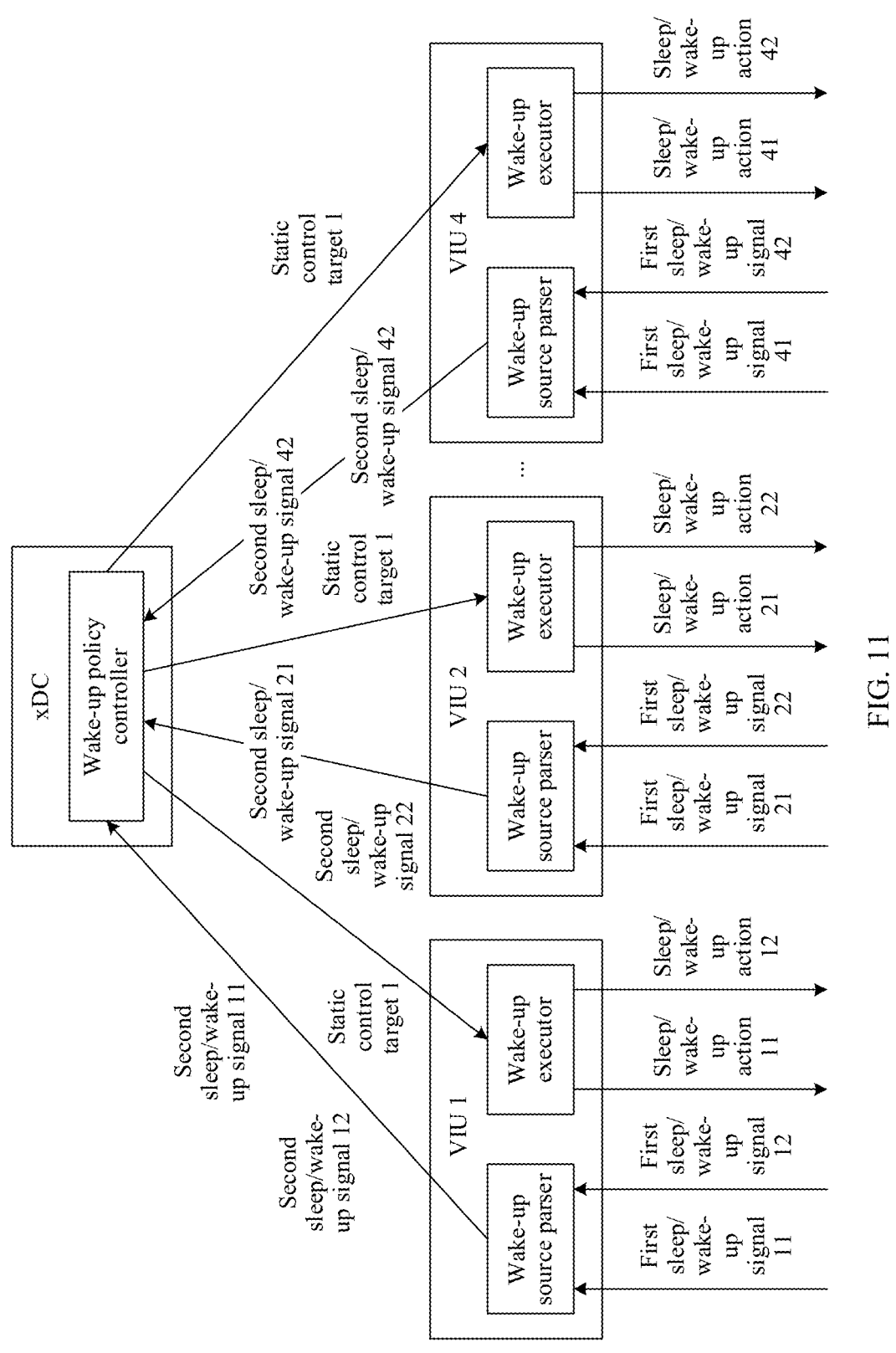
FIG. 11 is a schematic diagram of deployment of a wake-up/sleep system according to an embodiment of this disclosure.

FIG. 11 is a schematic diagram of deployment of a wake-up/sleep system according to an embodiment of this disclosure. As shown in FIG. 11, on the basis of the communication and computation architecture shown in FIG.

9, a wake-up source parser and a wake-up executor are deployed in each VIU (including the VIU 1, the VIU 2, the VIU 3, and the VIU 4), and a wake-up policy controller is deployed in an xDC.

Figure 12A:
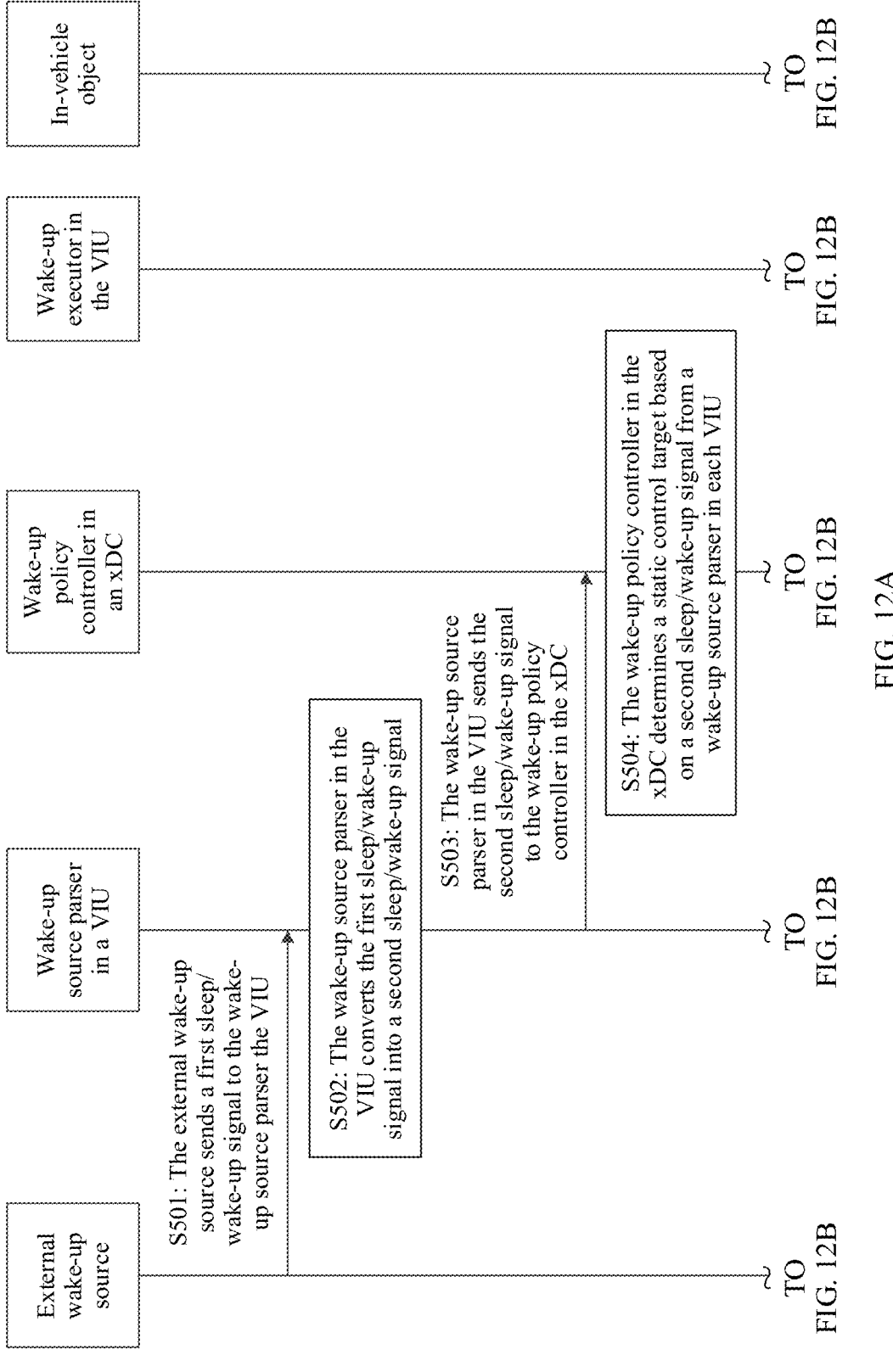

FIG. 12A and FIG. 12B are a flowchart of interaction of a sleep/wake-up method according to an embodiment of this disclosure. The method may be applied to the system shown in FIG. 11. As shown in FIG. 12A and FIG. 12B, the method includes the following steps.

Step S501: An external wake-up source sends a first sleep/wake-up signal to a wake-up source parser in a VIU.

The external signal source may send the first sleep/wake-up signal to the wake-up parser in each VIU. As shown in FIG. 11, the external wake-up source sends a first sleep/wake-up signal 11 and a first sleep/wake-up signal 12 to a wake-up source parser in a VIU 1. The external wake-up source sends a first sleep/wake-up signal 21 and a first sleep/wake-up signal 22 to a wake-up source parser in a VIU 2. The external wake-up source sends a first sleep/wake-up signal 31 and a first sleep/wake-up signal 32 (not shown) to a wake-up source parser in a VIU 3. The external wake-up source sends a first sleep/wake-up signal 41 and a first sleep/wake-up signal 42 to a wake-up source parser in a VIU 4. It may be understood that the external wake-up source may send more or fewer first sleep/wake-up signals than those shown in FIG. 11 to the wake-up source parser in the VIU.

In an example, an external wake-up source "PEPS" may send a first sleep/wake-up signal "CANNM packet" to the VIU 1.

Step S502: The wake-up source parser in the VIU converts the first sleep/wake-up signal into a second sleep/wake-up signal.

The wake-up source parser in each VIU may convert the received first sleep/wake-up signal into the second sleep/wake-up signal. As shown in FIG. 11, the wake-up source parser in the VIU 1 may convert the first sleep/wake-up signal 11 into a second sleep/wake-up signal 11, and convert the first sleep/wake-up signal 12 into a second sleep/wake-up signal 12. The wake-up source parser in the VIU 2 may convert the first sleep/wake-up signal 21 into a second sleep/wake-up signal 21, and convert the first sleep/wake-up signal 22 into a second sleep/wake-up signal 22. The wake-up source parser in the VIU 3 may convert the first sleep/wake-up signal 31 into a second sleep/wake-up signal 31, and convert the first sleep/wake-up signal 32 into a second sleep/wake-up signal 32 (not shown). The wake-up source parser in the VIU 4 may convert the first sleep/wake-up signal 41 into a second sleep/wake-up signal 41, and convert the first sleep/wake-up signal 42 into a second sleep/wake-up signal 42. It should be noted that the foregoing is merely an example of the first sleep/wake-up signal and the second sleep/wake-up signal. In actual execution, more or fewer first sleep/wake-up signals and second sleep/wake-up signals may be included.

In an example, the first sleep/wake-up signal "CANNM packet" may be converted into a second sleep/wake-up signal with "an identifier being 2 and a name being unlocking with a BLUETOOTH key".

Step S503: The wake-up source parser in the VIU sends the second sleep/wake-up signal to a wake-up policy controller in an xDC.

The wake-up source parser in each VIU may send the obtained second sleep/wake-up signal to the wake-up policy controller in the xDC for processing. As shown in FIG. 11, the wake-up source parser in the VIU 1 may send the second sleep/wake-up signal 11 and the second sleep/wake-up signal 12 to the wake-up policy controller in the xDC. The wake-up source parser in the VIU 2 may send the second sleep/wake-up signal 21 and the second sleep/wake-up signal 22 to the wake-up policy controller in the xDC. The wake-up source parser in the VIU 4 may send the second sleep/wake-up signal 41 and the second sleep/wake-up signal 42 to the wake-up policy controller in the xDC.

In an example, the wake-up source parser in the VIU 1 sends the second sleep/wake-up signal with "an identifier being 2 and a name being unlocking with a BLUETOOTH key" to the wake-up policy controller in the xDC.

Step S504: The wake-up policy controller in the xDC determines a static control target based on a second sleep/wake-up signal from a wake-up source parser in each VIU.

The wake-up policy controller in the xDC may determine a static control target based on each received second sleep/wake-up signal, and obtain a final static control target by taking a union set of the static control targets. As shown in FIG. 11, the wake-up policy controller in the xDC finally obtains a static control target 1.

In an example, the wake-up policy controller in the xDC obtains, based on the second sleep/wake-up signal with "an identifier being 2 and a name being unlocking with a BLUETOOTH key", a static control target with "an identifier being 2 and a name being wake-up of unlocking with a BLUETOOTH key" (as shown in Table 3).

Step S505: The wake-up policy controller in the xDC sends the static control target to a wake-up executor in each VIU.

As shown in FIG. 11, the wake-up policy controller in the xDC separately sends the static wake-up target 1 to the wake-up executor in the VIU 1, the wake-up executor in the VIU 2, the wake-up executor (not shown) in the VIU 3, and the wake-up executor in the VIU 4.

In an example, the wake-up policy controller in the xDC sends the static control target with "an identifier being 2 and a name being wake-up of unlocking with a BLUETOOTH key" to the wake-up executors in all VIUs.

Step S506: The wake-up executor in the VIU determines, based on the received static control target and a status of each in-vehicle object in the current VIU, an in-vehicle object that needs to be woken up and that is in the current VIU, and/or an in-vehicle object that needs to enter a sleep state and that is in the current VIU.

As shown in FIG. 11, the wake-up executor in the VIU 1 determines, based on the static control target 1 and a status of each in-vehicle object in the VIU 1, that a sleep/wake-up action 11 (for example, waking up an in-vehicle object 1) and a sleep/wake-up action 12 (for example, controlling an in-vehicle object 2 to enter a sleep state) need to be performed. The wake-up executor in the VIU 2 determines, based on the static control target 1 and a status of each in-vehicle object in the VIU 2, that a sleep/wake-up action 21 and a sleep/wake-up action 22 need to be performed. The wake-up executor in the VIU 3 determines, based on the static control target 1 and a status of each in-vehicle object in the VIU 3, that a sleep/wake-up action 31 and a sleep/wake-up action 32 (not shown) need to be performed. The wake-up executor in the VIU 4 determines, based on the static control target 1 and a status of each in-vehicle object in the VIU 4, that a sleep/wake-up action 41 and a sleep/wake-up action 42 need to be performed. It should be noted that the foregoing is merely an example of the sleep/wake-up action. In actual execution, more or fewer actions than sleep/wake-up actions may be determined.

In an example, the wake-up executor in the VIU 1 wakes up the ECU 11 and the ECU 12 that are connected to the CAN 11, and wakes up the ECU 14, the ECU 15, and the ECU 16 that are connected to the CAN 12. The wake-up executor in VIU 2 wakes up the ECU 21 connected to the CAN 21. The wake-up executor in the VIU 3 does not have a corresponding sleep/wake-up action. The wake-up executor in the VIU 4 does not have a sleep/wake-up action.

Step S507: The wake-up executor in the VIU wakes up the in-vehicle object that needs to be woken up and that is in the current VIU, and/or controls, to enter the sleep state, the in-vehicle object that needs to enter the sleep state and that is in the current VIU.

In an example, the VIU 1 and the VIU 2 perform the foregoing sleep/wake-up action, and the VIU 3 and the VIU 4 do not need to perform the sleep/wake-up action.

According to the sleep/wake-up method provided in this embodiment of this disclosure, sleep/wake-up signals generated in in-vehicle networks of different vehicle models may be converted into a unified sleep/wake-up signal, and a unified static control target is obtained, to wake up an in-vehicle object in a vehicle integration unit or enable an in-vehicle object in the vehicle integration unit to enter a sleep state. Therefore, sleep/wake-up control in a communication and computation architecture is implemented by using software.

Considering that a vehicle has a requirement for specific wake-up duration, for example, when an owner approaches the vehicle within a specific distance (for example, 5 meters), the vehicle detects a vehicle key. In this case, the vehicle wakes up the VIU and xDC. If the user further approaches the vehicle, the vehicle may be automatically unlocked, to provide good user experience for the owner. If wake-up time of the vehicle is long (for example, more than 1 second), a door has not been unlocked when the owner needs to open the door. This affects customer experience. In FIG. 11, the wake-up policy controller is deployed in the xDC, and all sleep/wake-up actions need to pass through a process of "VIU" to "xDC" and then back to "VIU". Therefore, sleep/wake-up duration of the vehicle is prolonged, and user experience may be affected.

In a possible implementation, the wake-up source parser, the wake-up policy controller, and the wake-up executor in the sleep/wake-up system may all be deployed in a vehicle integration unit.

Figure 13:
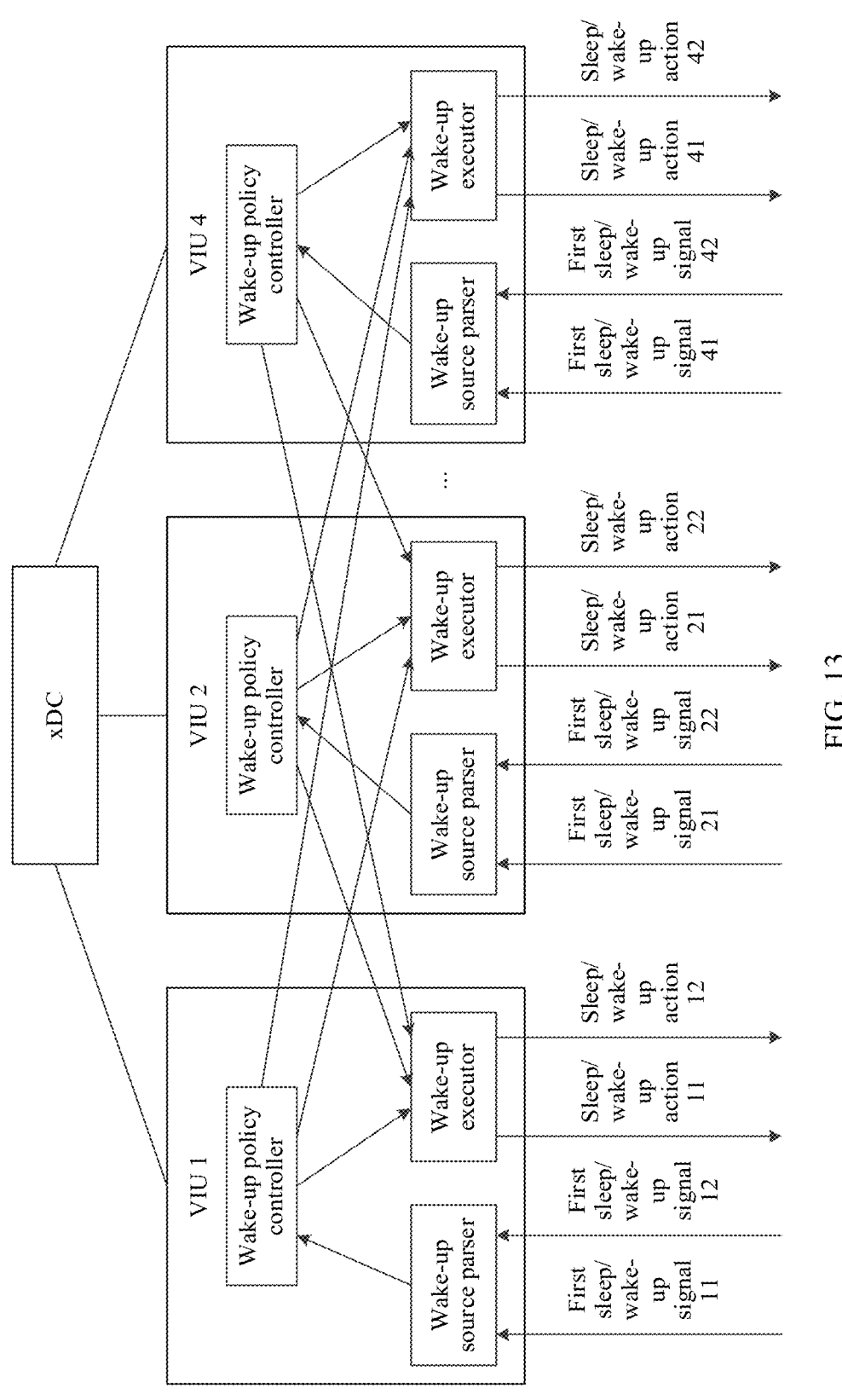
FIG. 13 is a schematic diagram of deployment of a wake-up/sleep system according to an embodiment of this disclosure.

FIG. 13 is a schematic diagram of deployment of a wake-up/sleep system according to an embodiment of this disclosure. As shown in FIG. 13, on the basis of the communication and computation architecture shown in FIG. 9, a wake-up source parser, a wake-up executor, and a wake-up policy controller are deployed in each VIU (including the VIU 1, the VIU 2, the VIU 3, and the VIU 4).

Considering that an external wake-up source on one VIU affects in-vehicle objects connected to other VIUs, a static control target output by the wake-up policy controller on one VIU needs to be sent to the wake-up executor on each VIU for processing. To simplify the design, it is assumed that wake-up policies (namely, the second mapping relationship) carried by all the wake-up policy controllers are the same. In this case, the wake-up source parser on one VIU only needs to send a static control target to the wake-up executor on each VIU, and there is no need to send a second sleep/wake-up signal to the wake-up policy controllers on the other VIUs for processing. In addition, it is assumed that an in-vehicle network is properly planned. When the wake-up policy controller on one VIU supports only an external wake-up source on the VIU (that is, the wake-up policy controller can convert only a first sleep/wake-up signal generated on the VIU), an objective of waking up the vehicle and an objective of controlling the vehicle to enter a sleep state can still be implemented. In principle, one wake-up policy controller is deployed for each VIU. In a design process of the in-vehicle network, if it is found that an external wake-up source is not directly received in a specific VIU, then there is no need to deploy a wake-up policy controller for the VIU.

Figure 14A:
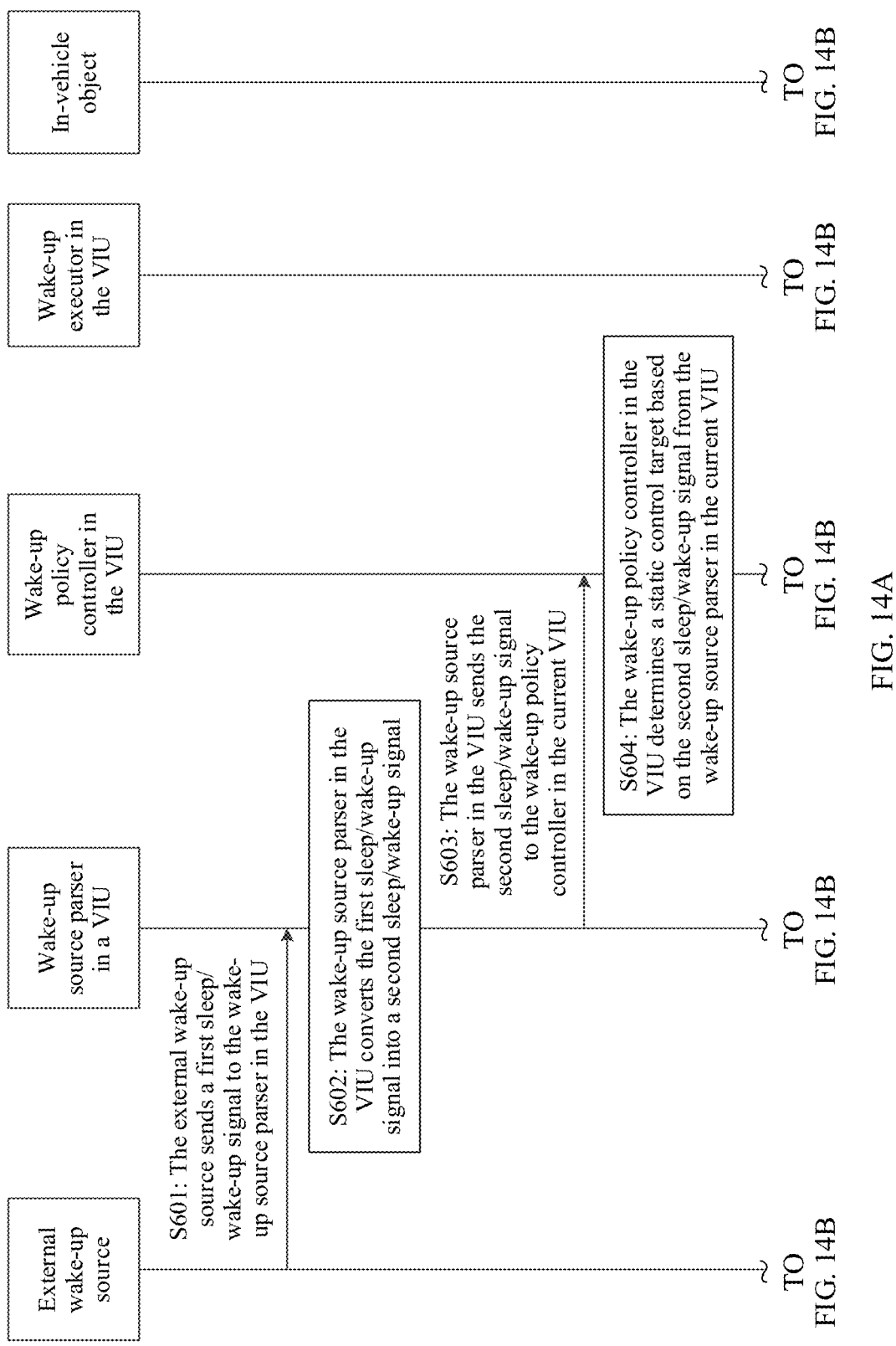

FIG. 14A and FIG. 14B are a flowchart of interaction of a sleep/wake-up method according to an embodiment of this disclosure. The method may be applied to the system shown in FIG. 13. As shown in FIG. 14A and FIG. 14B, the method includes the following steps.

Step S601: An external wake-up source sends a first sleep/wake-up signal to a wake-up source parser in a VIU.

Step S602: The wake-up source parser in the VIU converts the first sleep/wake-up signal into a second sleep/wake-up signal.

For step S601 and step S602, refer to step S501 and step S502. Details are not described herein again.

Step S603: The wake-up source parser in the VIU sends the second sleep/wake-up signal to a wake-up policy controller in the current VIU.

In an example, the wake-up source parser in the VIU 1 sends a second sleep/wake-up signal with "an identifier being 2 and a name being unlocking with a BLUETOOTH key" to the wake-up policy controller in the VIU 1.

Step S604: The wake-up policy controller in the VIU determines a static control target based on the second sleep/wake-up signal from the wake-up source parser in the current VIU.

In an example, the wake-up policy controller in the VIU 1 obtains, based on the second sleep/wake-up signal with "an identifier being 2 and a name being unlocking with a BLUETOOTH key", a static control target with "an identifier being 2 and a name being wake-up of unlocking with a BLUETOOTH key" (as shown in Table 3).

Step S605: The wake-up policy controller in the VIU sends the static control target to a wake-up executor in the VIU.

In a possible implementation, the wake-up policy controller in the VIU may send the static control target to the wake-up executors in all the VIUs. Then, the wake-up executor in each VIU may perform step S606 and step S607 to control an in-vehicle object. For example, as shown in FIG. 9, the wake-up policy controller in the VIU 1 separately sends the static control target with "an identifier being 2 and a name being wake-up of unlocking with a BLUETOOTH key" to the wake-up executors in the VIU 1, VIU 2, VIU 3, and VIU 4.

In a possible implementation, the wake-up policy controller in the VIU may send the static control target to a wake-up executor in a VIU related to the static control target. For example, as shown in Table 3, content of the static control target with "an identifier being 2 and a name being wake-up of unlocking with a BLUETOOTH key" involves the CAN 11, the CAN 12, and the CAN 31. As shown in FIG. 9, the CAN 11 and the CAN 12 are connected to the VIU 1, and the CAN 31 is connected to the VIU 3. That is, VIUs related to the static control target with "an identifier being 2 and a name being wake-up of unlocking with a BLUETOOTH key" are the VIU 1 and the VIU 3. Therefore, the wake-up policy controller in the VIU 1 may separately send the static control target to the wake-up executors in the VIU 1 and the VIU 3.

Step S606: The wake-up executor in the VIU determines, based on the received static control target and a status of each in-vehicle object in the current VIU, an in-vehicle object that needs to be woken up and that is in the current VIU, and/or an in-vehicle object that needs to enter a sleep state and that is in the current VIU.

Step S607: The wake-up executor in the VIU wakes up the in-vehicle object that needs to be woken up and that is in the current VIU, and/or controls, to enter the sleep state, the in-vehicle object that needs to enter the sleep state and that is in the current VIU.

For step S606 and step S607, refer to step S506 and step S507. Details are not described herein again.

In this embodiment of this disclosure, the wake-up policy controller deployed in the xDC is moved down to each VIU, so that when a local in-vehicle object of the VIU needs to enter a sleep state or be woken up, a sleep/wake-up speed is accelerated.

For the wake-up policy controller mentioned in FIG. 13, if static control targets corresponding to wake-up sources received by different VIUs conflict, for example, the VIU 1 triggers the CAN 21 to be woken up, and the VIU 2 triggers the CAN 21 to enter a sleep state, a conflict occurs.

In a possible implementation, the wake-up policy controller is divided into a distributed wake-up policy controller and a centralized wake-up policy controller, the wake-up source parser, the wake-up executor, and the distributed wake-up policy controller in the sleep/wake-up system are deployed in a vehicle integration unit, and the centralized wake-up policy controller is deployed in a domain controller.

Figure 15:
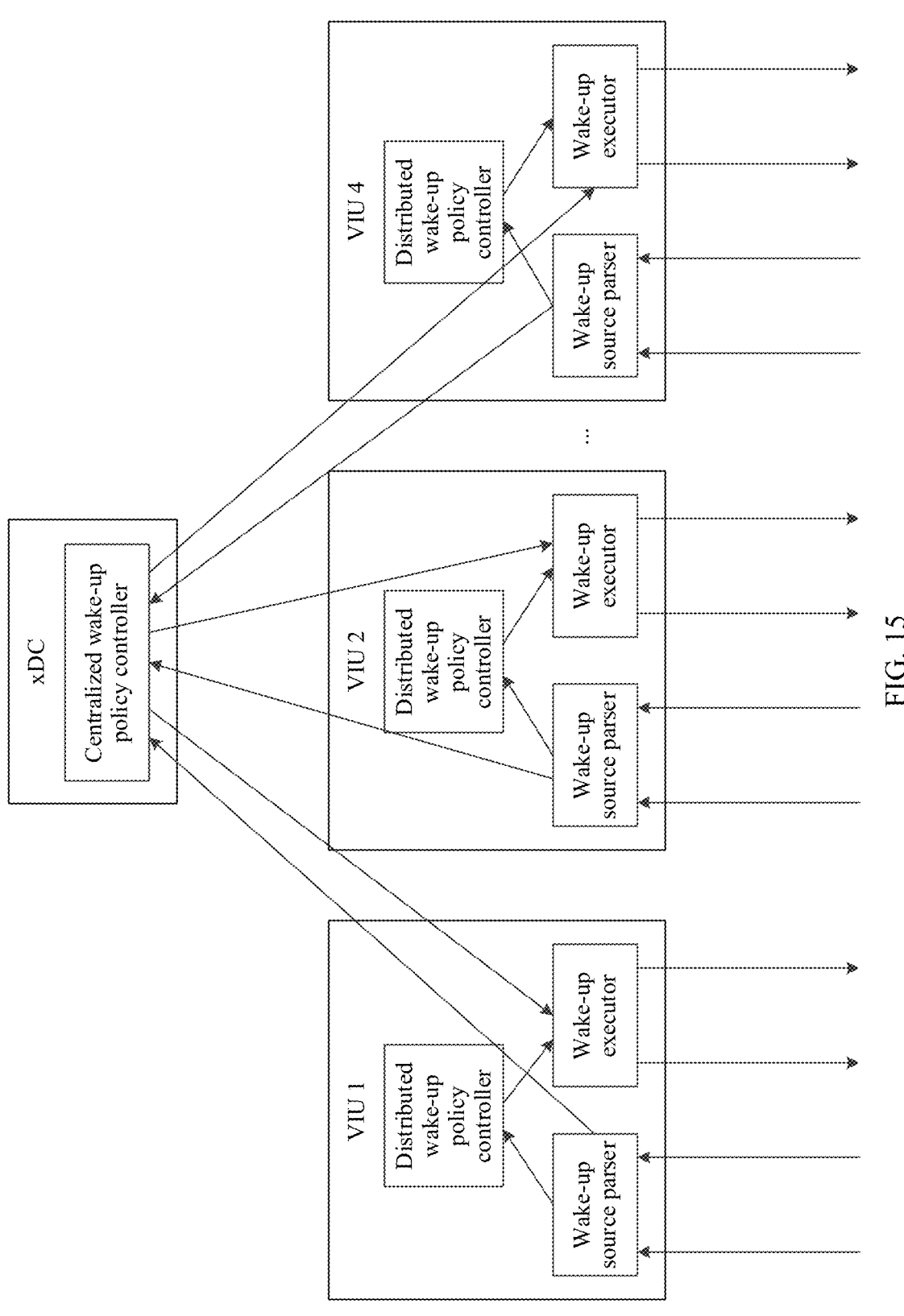
FIG. 15 is a schematic diagram of deployment of a wake-up/sleep system according to an embodiment of this disclosure.

FIG. 15 is a schematic diagram of deployment of a wake-up/sleep system according to an embodiment of this disclosure. As shown in FIG. 15, on the basis of the communication and computation architecture shown in FIG. 9, a wake-up source parser, a wake-up executor, and a distributed wake-up policy controller are deployed in each VIU (including the VIU 1, the VIU 2, the VIU 3, and the VIU 4), and a centralized wake-up policy controller is deployed in an xDC.

To ensure that a local wake-up source can quickly wake up an in-vehicle object, and avoid a conflict between wake-up and sleep behaviors of different in-vehicle objects caused by different wake-up sources, based on a principle of "fast wake-up and slow sleep", it is necessary to divide work between the distributed wake-up policy controller and the centralized wake-up policy controller for a wake-up action in this embodiment of this disclosure. The distributed wake-up policy controller can only determine wake-up of an in-vehicle object in the local VIU. The centralized wake-up policy controller can only determine wake-up of an in-vehicle object across the VIUs.

To ensure that the centralized policy controller determines wake-up sources from different VIUs, the wake-up source interface 1 needs to be modified, and a definition of a source VIU needs to be added. The modified interface 1 (which may be referred to as an interface 3) is shown in Table 6.

TABLE 6

| No. | Identifier of a VIU corresponding to a wake-up source | Identifier of the second sleep/ wake-up signal | Name of the second sleep/wake-up signal |
|---|---|---|---|
| 1 | VIU 1 | 2 | Unlocking with a BLUETOOTH key |
| 2 | VIU 1 | 4 | KL15 |

Figure 16A:
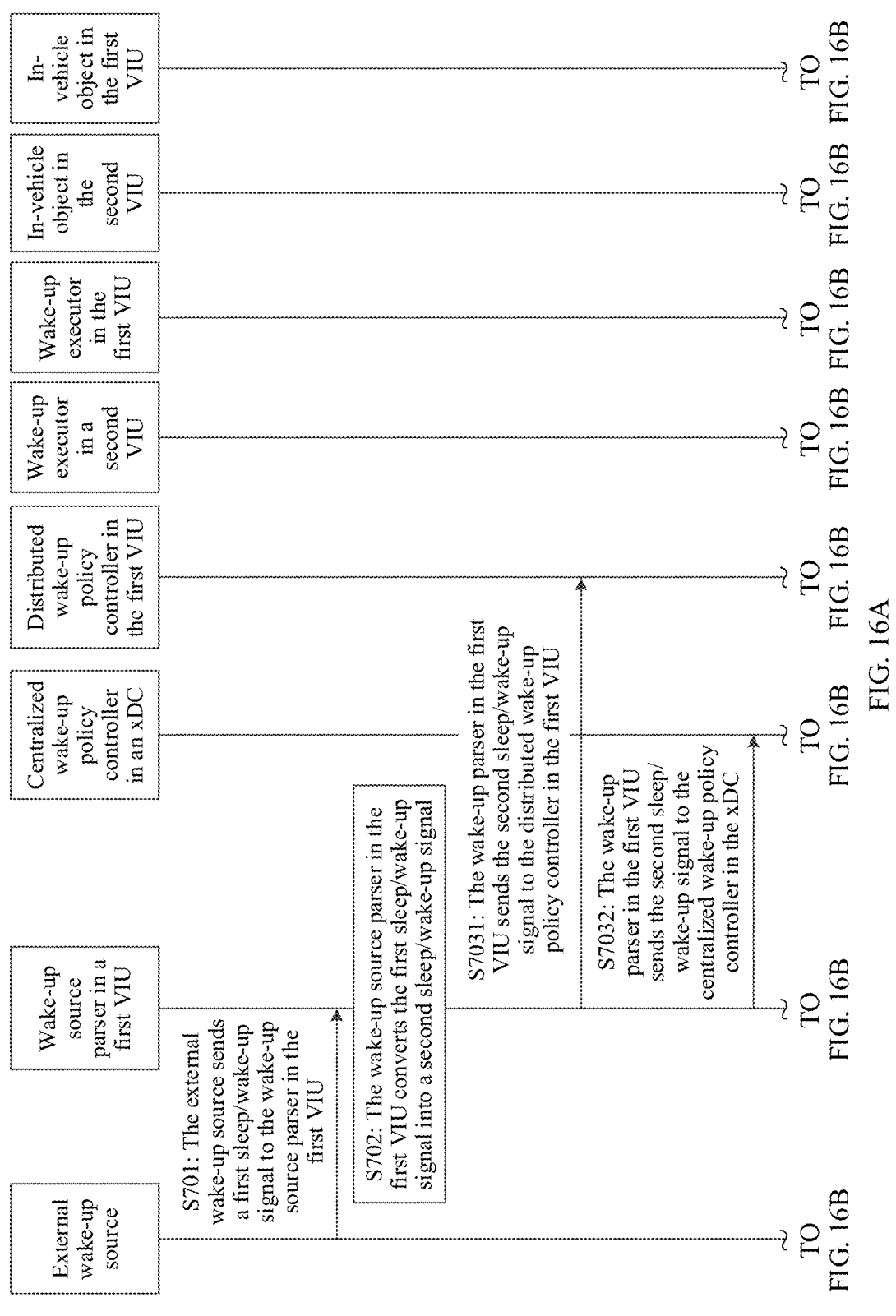
Figure 16C:
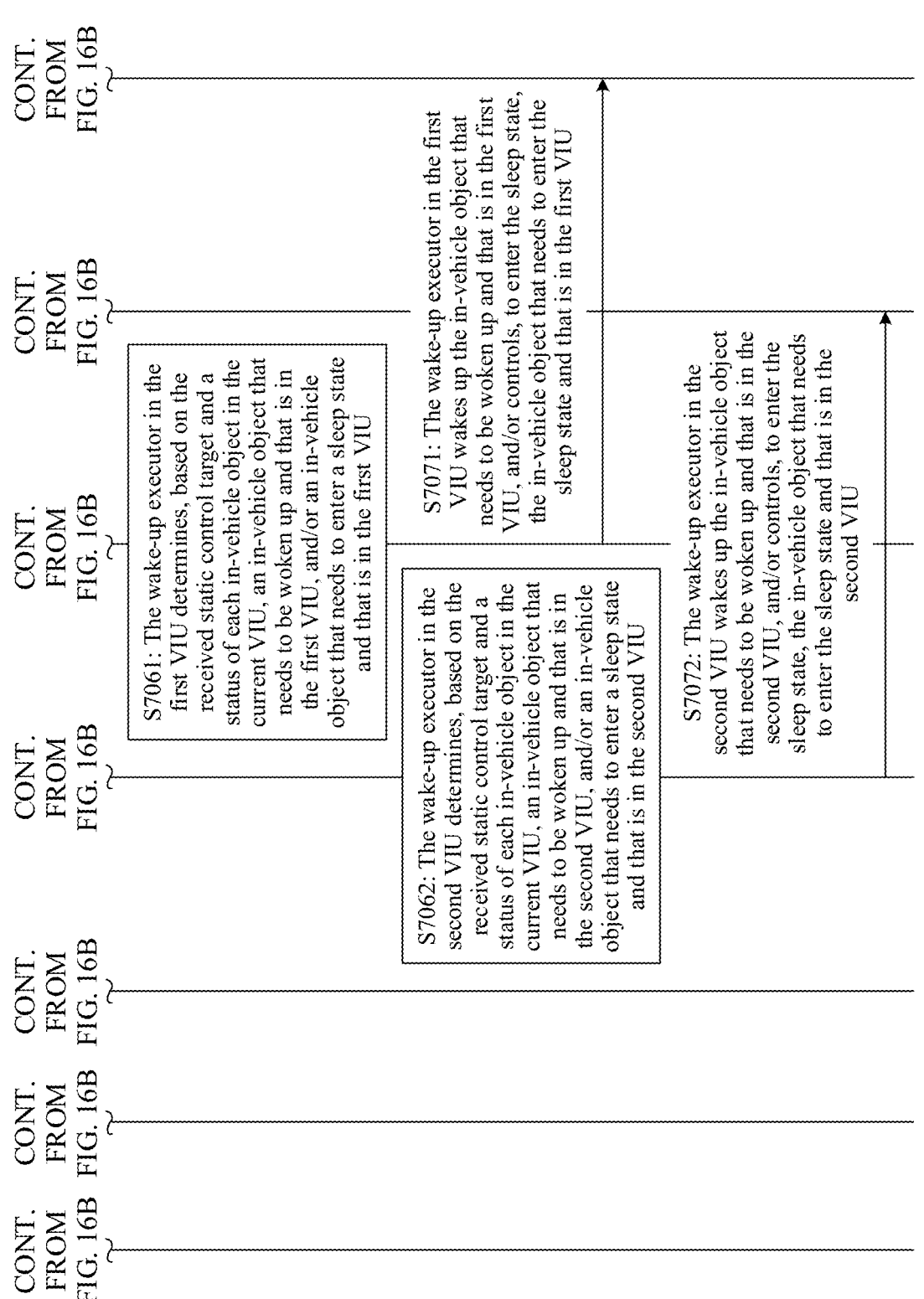

For sleep, in this embodiment of this disclosure, a policy related to entering a sleep state needs to be moved to the centralized wake-up policy controller based on FIG. 14A and FIG. 14B. FIG. 16A to FIG. 16C are a flowchart of interaction of a sleep/wake-up method according to an embodiment of this disclosure. The method may be applied to the system shown in FIG. 15. As shown in FIG. 16A to FIG. 16C, the method includes the following steps.

Step S701: An external wake-up source sends a first sleep/wake-up signal to a wake-up source parser in a first VIU.

The first VIU represents any VIU in a communication and computation architecture.

Step S702: The wake-up source parser in the first VIU converts the first sleep/wake-up signal into a second sleep/wake-up signal.

For step S701 and step S702, refer to step S501 and step S502. Details are not described herein again.

Step S7031: The wake-up parser in the first VIU sends the second sleep/wake-up signal to a distributed wake-up policy controller in the first VIU.

In an example, the wake-up source parser in the VIU 1 sends a second sleep/wake-up signal with "an identifier being 2 and a name being unlocking with a BLUETOOTH key" to the distributed wake-up policy controller in the VIU 1.

Step S7032: The wake-up parser in the first VIU sends the second sleep/wake-up signal to a centralized wake-up policy controller in an xDC.

In an example, the wake-up source parser in the VIU 1 sends the second sleep/wake-up signal with "an identifier being 2 and a name being unlocking with a BLUETOOTH key" to the centralized wake-up policy controller in the xDC.

Step S7041: The distributed wake-up policy controller in the first VIU determines a static control target based on the second sleep/wake-up signal from the wake-up source parser in the first VIU.

In an example, the distributed wake-up policy controller in the VIU 1 determines, based on the second sleep/wake-up signal with "an identifier being 2 and a name being unlocking with a BLUETOOTH key" from the VIU 1, a static control target with "an identifier being 2 and a name being wake-up of unlocking with a BLUETOOTH key".

Step S7042: The centralized wake-up policy controller in the xDC determines a static control target based on the second sleep/wake-up signal from the wake-up source parser in the first VIU.

In an example, the centralized wake-up policy controller in the xDC determines, based on the second sleep/wake-up signal with "an identifier being 2 and a name being unlocking with a BLUETOOTH key" from the VIU 1, a static control target with "an identifier being 2 and a name being wake-up of unlocking with a BLUETOOTH key".

Step S7051: The distributed wake-up policy controller in the first VIU sends the determined static wake-up target to the wake-up executor in the first VIU.

In an example, the wake-up policy controller in the VIU 1 sends a static control target with "an identifier being 2 and a name being wake-up of unlocking with a BLUETOOTH key" to the wake-up executor in the VIU 1.

Step S7052: The centralized wake-up policy controller in the xDC sends the determined static wake-up target to a wake-up executor in a second VIU.

The second VIU represents a VIU other than the first VIU in the communication and computation architecture.

In an example, the wake-up policy controller in the xDC sends the static control target with "an identifier being 2 and a name being wake-up of unlocking with a BLUETOOTH key" to a wake-up executor in a VIU other than the VIU 1.

Step S7061: The wake-up executor in the first VIU determines, based on the received static control target and a status of each in-vehicle object in the current VIU, an in-vehicle object that needs to be woken up and that is in the first VIU, and/or an in-vehicle object that needs to enter a sleep state and that is in the first VIU.

In an example, the wake-up executor in the VIU 1 wakes up the ECU 11 and the ECU 12 that are connected to the CAN 11, and wakes up the ECU 14, the ECU 15, and the ECU 16 that are connected to the CAN 12.

Step S7062: The wake-up executor in the second VIU determines, based on the received static control target and a status of each in-vehicle object in the current VIU, an in-vehicle object that needs to be woken up and that is in the second VIU, and/or an in-vehicle object that needs to enter a sleep state and that is in the second VIU.

In an example, the wake-up executor in the VIU 2 wakes up the ECU 21 connected to the CAN 21. The wake-up executor in the VIU 3 does not have a corresponding sleep/wake-up action. The wake-up executor in the VIU 4 does not have a sleep/wake-up action.

Step S7071: The wake-up executor in the first VIU wakes up the in-vehicle object that needs to be woken up and that is in the first VIU, and/or controls, to enter the sleep state, the in-vehicle object that needs to enter the sleep state and that is in the first VIU.

Step S7072: The wake-up executor in the second VIU wakes up the in-vehicle object that needs to be woken up and that is in the second VIU, and/or controls, to enter the sleep state, the in-vehicle object that needs to enter the sleep state and that is in the second VIU.

In this embodiment of this disclosure, because a distributed wake-up policy controller is locally deployed on a VIU, a wake-up speed can be increased when a wake-up source of the VIU needs to wake up a local in-vehicle object. In addition, because the centralized wake-up policy controller is still retained in the xDC, a conflict problem of sleep/wake-up is resolved, and reliability is improved.

It should be noted that, in this embodiment of this disclosure, the wake-up policy controller deployed in the VIU may be referred to as a distributed wake-up policy controller, and the wake-up policy controller deployed in the xDC may be referred to as a centralized wake-up policy controller or a global wake-up policy controller.

Figure 17:
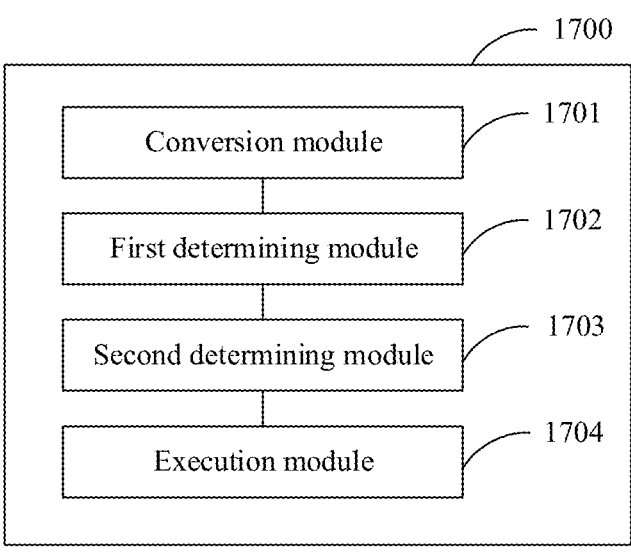
FIG. 17 is a schematic diagram of a structure of a sleep/wake-up apparatus according to an embodiment of this disclosure.

FIG. 17 is a schematic diagram of a structure of a sleep/wake-up apparatus 1700 according to an embodiment of this disclosure. As shown in FIG. 17, the apparatus 1700 may include a conversion module 1701 configured to convert at least one first sleep/wake-up signal into at least one second sleep/wake-up signal, where the first sleep/wake-up signal represents a sleep/wake-up signal generated in an in-vehicle network of a first vehicle model, and the second sleep/wake-up signal represents a unified sleep/wake-up signal into which sleep/wake-up signals that are generated in in-vehicle networks of different vehicle models and that have a same function are converted, a first determining module 1702 configured to determine at least one static control target based on the at least one second sleep/wake-up signal, where the static control target indicates a function of the first sleep/wake-up signal, a second determining module 1703 configured to determine at least one sleep/wake-up action based on the at least one static control target, where the sleep/wake-up action is used to wake up at least one in-vehicle object in at least one vehicle integration unit or control at least one in-vehicle object in the at least one vehicle integration unit to enter a sleep state, and an execution module 1704 configured to perform the at least one sleep/wake-up action.

In a possible implementation, the conversion module is further configured to determining, based on a first mapping relationship, a second sleep/wake-up signal corresponding to any one of the at least one first sleep/wake-up signal, where the first mapping relationship represents a mapping relationship between the sleep/wake-up signal generated in the in-vehicle network of the first vehicle model and the unified sleep/wake-up signal.

In a possible implementation, the first determining module is further configured to determining, based on a second mapping relationship, a static control target corresponding to any one of the at least one second sleep/wake-up signal, where the second mapping relationship represents a mapping relationship between the unified sleep/wake-up signal and an in-vehicle object, and merging a static control target corresponding to each second sleep/wake-up signal, to obtain the at least one static control target.

In a possible implementation, the second determining module is further configured to determining, based on a third mapping relationship, at least one vehicle integration unit corresponding to any one of the at least one static control target, and an in-vehicle object on which sleep/wake-up control needs to be performed and that is in each determined vehicle integration unit, where the third mapping relationship represents a mapping relationship between a static control target, a vehicle integration unit, and an in-vehicle object on which sleep/wake-up control needs to be performed, and determining the at least one sleep/wake-up action based on whether the in-vehicle object on which sleep/wake-up control needs to be performed is currently in an awake state or a sleep state.

Figure 18:
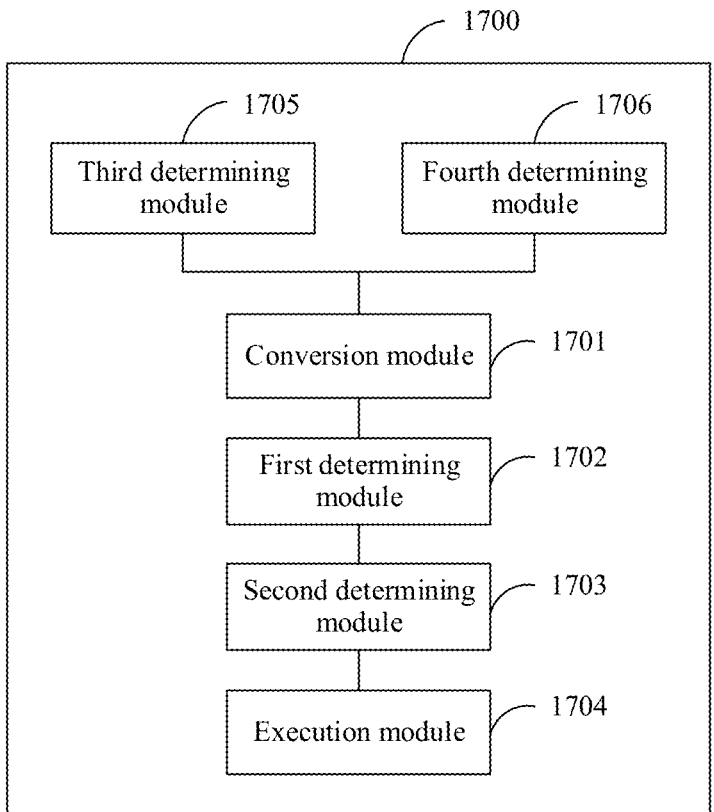
FIG. 18 is a schematic diagram of a structure of a sleep/wake-up apparatus according to an embodiment of this disclosure.

In a possible implementation, the first sleep/wake-up signal includes a first signal used to wake up an in-vehicle object and/or a second signal used to control an in-vehicle object to enter a sleep state. FIG. 18 is a schematic diagram of a structure of a sleep/wake-up apparatus 1700 according to an embodiment of this disclosure. As shown in FIG. 18, on the basis of FIG. 17, the apparatus 1700 may further include a third determining module 1705 configured to, when a network management packet or a service packet is received, or a first level change is detected, determine that the first signal is obtained, or a fourth determining module 1706 configured to, when no network management packet or no service packet is received within a preset time, or a second level change is detected, determine that the second signal is obtained.

An embodiment of this disclosure provides a sleep/wake-up apparatus, including a processor and a memory configured to store instructions that can be executed by the processor. The processor is configured to implement the foregoing method when executing the instructions.

An embodiment of this disclosure provides a non-volatile computer-readable storage medium. The non-volatile computer-readable storage medium stores computer program instructions. When the computer program instructions are executed by a processor, the foregoing method is implemented.

An embodiment of this disclosure provides a computer program product, including computer-readable code or a non-volatile computer-readable storage medium carrying computer-readable code. When the computer-readable code is run in a processor of an electronic device, the processor in the electronic device performs the foregoing method.

The computer-readable storage medium can be a tangible device that can retain and store instructions for use by an instruction execution device. The computer-readable storage medium may be, for example, (but is not limited to) an electronic storage device, a magnetic storage device, an optical storage device, an electromagnetic storage device, a semiconductor storage device, or any suitable combination thereof. More specific examples (non-exhaustive list) of the computer-readable storage medium include a portable computer disk, a hard disk drive, a random-access memory (RAM), a read-only memory (ROM), an erasable programmable ROM (EPROM, or flash memory), a static RAM (SRAM), a portable compact disc (CD) ROM (CD-ROM), a DIGITAL VERSATILE DISC (DVD), a memory stick, a floppy disk, a mechanical coding device, for example, a punching card or a groove protrusion structure that stores instructions, and any suitable combination thereof.

The computer-readable program instructions or code described herein can be downloaded to respective computing/processing devices from a computer-readable storage medium or to an external computer or external storage device via a network, such as the Internet, a local area network, a wide area network, and/or a wireless network. The network may include a copper transmission cable, optical fiber transmission, wireless transmission, a router, a firewall, a switch, a gateway computer, and/or an edge server. A network adapter card or network interface in each computing/processing device receives the computer-readable program instructions from the network and forwards the computer-readable program instructions for storage in a computer-readable storage medium in each computing/processing device.

The computer program instruction used to perform an operation in this disclosure may be an assembly instruction, an instruction set architecture (ISA) instruction, a machine instruction, a machine-related instruction, microcode, a firmware instruction, status setting data, or source code or object code written in any combination of one or more programming languages. The programming languages include an object-oriented programming language such as Smalltalk or C++, and a procedural programming language such as a "C" language or a similar programming language. The computer-readable program instructions may be executed entirely on a user computer, partly on the user computer, as a stand-alone software package, partly on the user computer and partly on a remote computer, or entirely on the remote computer or a server. In a case involving a remote computer, the remote computer may be connected to a user computer through any type of network, including a local area network (LAN) or a wide area network (WAN), or may be connected to an external computer (for example, through the Internet by using an Internet service provider). In some embodiments, an electronic circuit, for example, a programmable logic circuit, a field-programmable gate array (FPGA), or a programmable logic array (PLA), is customized by using status information of computer-readable program instructions. The electronic circuit may execute the computer-readable program instructions, to implement various aspects of this disclosure.

The various aspects of this disclosure are described herein with reference to the flowcharts and/or block diagrams of the method, the apparatus (system), and the computer program product according to embodiments of this disclosure. It should be understood that each block of the flowcharts and/or block diagrams and a combination of blocks in the flowcharts and/or block diagrams may be implemented by the computer-readable program instructions.

These computer-readable program instructions may be provided to a processor of a general-purpose computer, a dedicated computer, or another programmable data processing apparatus to produce a machine, so that the instructions, when executed by the processor of the computer or the another programmable data processing apparatus, create an apparatus for implementing functions/actions specified in one or more blocks in the flowcharts and/or block diagrams. These computer-readable program instructions may alternatively be stored in the computer-readable storage medium. These instructions enable a computer, a programmable data processing apparatus, and/or another device to work in a specific manner. Therefore, the computer-readable medium storing the instructions includes an artifact that includes instructions for implementing the various aspects of the functions/actions specified in the one or more blocks in the flowcharts and/or the block diagrams.

The computer-readable program instructions may alternatively be loaded onto a computer, another programmable data processing apparatus, or another device, so that a series of operations and steps are performed on the computer, the another programmable data processing apparatus, or the another device to produce a computer-implemented process. Therefore, the instructions executed on the computer, the another programmable data processing apparatus, or the another device implements the functions/actions specified in the one or more blocks in the flowcharts and/or block diagrams.

The flowcharts and block diagrams in the accompanying drawings show possible implementation of system architectures, functions, and operations of apparatuses, systems, methods, and computer program products according to a plurality of embodiments of this disclosure. In this regard, each block in the flowcharts or block diagrams may represent a module, a program segment, or a part of the instructions, and the module, the program segment, or the part of the instructions includes one or more executable instructions for implementing a specified logical function. In some alternative implementations, a function marked in the block may also occur in an order different from that marked in the accompanying drawings. For example, two consecutive blocks may actually be performed substantially in parallel, and may sometimes be performed in a reverse order, depending on a function involved.

It should also be noted that each block in the block diagrams and/or the flowcharts, and a combination of blocks in the block diagrams and/or the flowcharts may be implemented by hardware (for example, a circuit or an application-specific integrated circuit (ASIC)) that performs a corresponding function or action, or may be implemented by a combination of hardware and software, for example, firmware.

Although the present disclosure is described with reference to embodiments, in a process of implementing the present disclosure that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

The foregoing has described embodiments of this disclosure. The foregoing descriptions are examples, are not exhaustive, and are not limited to the disclosed embodiments. Many modifications and changes are apparent to a person of ordinary skill in the art without departing from the scope of the described embodiments. The selection of terms used in this specification is intended to best explain the principles of embodiments, practical applications, or improvements to technologies in the market, or to enable another person of ordinary skill in the art to understand embodiments disclosed in this specification.

What is claimed is:

1. A method, comprising:

converting at least one first sleep/wake-up signal into at least one unified sleep/wake-up signal, wherein the at least one first sleep/wake-up signal is from an in-vehicle network of a first vehicle model, and wherein the at least one unified sleep/wake-up signal is a conversion from at least one second sleep/wake-up signals from in-vehicle networks of different vehicle models;

obtaining at least one static control target based on the at least one unified sleep/wake-up signal, wherein the at least one static control target indicates a function of the at least one first sleep/wake-up signal; and performing, based on the at least one static control target, at least one sleep/wake-up action, wherein the at least one sleep/wake-up action wakes up at least one in-vehicle object in at least one vehicle integration controller or controls the at least one in-vehicle object to enter a sleep state.

2. The method of claim 1, further comprising obtaining, based on a mapping relationship, a unified sleep/wake-up signal corresponding to any one of the at least one first sleep/wake-up signal, wherein the mapping relationship is between the at least one first sleep/wake-up signal and the unified sleep/wake-up signal.

3. The method of claim 1, further comprising:

obtaining, based on a mapping relationship, static control targets corresponding to any one of the at least one unified sleep/wake-up signal, wherein the mapping relationship is between the unified sleep/wake-up signal and the at least one in-vehicle object; and merging the static control targets to obtain the at least one static control target.

4. The method according to of claim 1, further comprising:

obtaining, based on a mapping relationship, the at least one vehicle integration controller corresponding to of the at least one static control target and the at least one in-vehicle object on which sleep/wake-up control is to be performed and that is in the at least one vehicle integration controller, wherein the mapping relationship between a is among the at least one static control target, the at least one vehicle integration controller, and the at least one in-vehicle object; and obtaining the at least one sleep/wake-up action based on whether the at least one in-vehicle object is currently in an awake state or the sleep state.

5. The method of claim 1, wherein the at least one first sleep/wake-up signal comprises a first signal for waking up the at least one in-vehicle object or a second signal for controlling the at least one in-vehicle object to enter the sleep state, and wherein the method further comprises:

obtaining the first signal when receiving a network management packet or a service packet; and obtaining the second signal when the network management packet or the service packet is not received within a preset time.

6. The method of claim 1, wherein the at least one first sleep/wake-up signal comprises a first signal for waking up the at least one in-vehicle object or a second signal for controlling the at least one in-vehicle object to enter the sleep state, and wherein the method further comprises:

obtaining the first signal when detecting a first level change; and obtaining the second signal when detecting a second level change.

7. A system comprising:

a wake-up source parser configured to:

convert at least one first sleep/wake-up signal into at least one unified sleep/wake-up signal, wherein the at least one first sleep/wake-up signal is from an in-vehicle network of a first vehicle model, and wherein the at least one unified sleep/wake-up signal is a conversion from at least one second sleep/wake-up signal from in-vehicle networks of different vehicle models; and send the at least one unified sleep/wake-up signal;

a wake-up policy controller communicatively coupled to the wake-up source parser and configured to:

receive the at least one unified sleep/wake-up signal;

obtain at least one static control target based on the at least one unified sleep/wake-up signal, wherein the at least one static control target indicates a function of the at least one first sleep/wake-up signal; and send the at least one static control target; and a wake-up executor communicatively coupled to the wake-up policy controller and configured to:

receive the at least one static control target; and perform, based on the at least one static control target, at least one sleep/wake-up action, wherein the at least one sleep/wake-up action wakes up at least one in-vehicle object in at least one vehicle integration controller or controls the at least one in-vehicle object to enter a sleep state.

8. The system of claim 7, wherein the wake-up source parser and the wake-up executor are in the at least one vehicle integration controller, and wherein the wake-up policy controller is in a domain controller.

9. The system of claim 7, wherein the wake-up source parser, the wake-up policy controller, and the wake-up executor are in the at least one vehicle integration controller.

10. The system of claim 7, wherein the wake-up policy controller comprises:

a distributed wake-up policy controller, wherein the wake-up source parser, the wake-up executor, and the distributed wake-up policy controller are in the at least one vehicle integration controller; and a centralized wake-up policy controller in a domain controller.

11. The system of claim 7, wherein the wake-up source parser is further configured to obtain, based on a mapping relationship, a unified sleep/wake-up signal corresponding to any one of the at least one first sleep/wake-up signal, and wherein the first mapping relationship is between the at least one first sleep/wake-up signal and the unified sleep/wake-up signal.

12. The system of claim 7, wherein the wake-up policy controller is further configured to:

obtain, based on a mapping relationship, static control targets corresponding to the at least one unified sleep/wake-up signal, wherein the mapping relationship is between the unified sleep/wake-up signal and the at least one in-vehicle object; and merge the static control targets to obtain the at least one static control target.

13. The system of claim 7, wherein the wake-up executor is further configured to:

obtain, based on a mapping relationship, the at least one vehicle integration controller corresponding to the at least one static control target and the at least one in-vehicle object on which sleep/wake-up control is to be performed and that is in the at least one vehicle integration controller, wherein the mapping relationship is among the at least one static control target, the at least one vehicle integration controller, and the at least one in-vehicle object; and obtain the at least one sleep/wake-up action based on whether the at least one in-vehicle object is currently in an awake state or the sleep state.

14. The system of claim 7, wherein the first sleep/wake-up signal comprises a first signal for waking up the at least one in-vehicle object or a second signal for controlling the at least one in-vehicle object to enter the sleep state, and wherein the sleep/wake-up system further comprises a wake-up source configured to:

obtain the first signal when receiving a network management packet or a service packet or when detecting a first level change and obtain the second signal when the network management packet or the service packet is not received within a preset time or when detecting a second level change.

15. An apparatus comprising:

a memory configured to store instructions; and a processor coupled to the memory and configured to execute the instructions to cause the apparatus to:

convert at least one first sleep/wake-up signal into at least one unified sleep/wake-up signal, wherein the at least one first sleep/wake-up signal is from an in-vehicle network of a first vehicle model, and wherein the at least one unified sleep/wake-up signal is a conversion from at least one second sleep/wake-up signal in-vehicle networks of different vehicle models;

obtain at least one static control target based on the at least one unified sleep/wake-up signal, wherein the at least one static control target indicates a function of the at least one first sleep/wake-up signal;

obtain at least one sleep/wake-up action based on the at least one static control target, wherein the at least one sleep/wake-up action is used to wakes up at least one in-vehicle object in at least one vehicle integration controller or controls the at least one in-vehicle object to enter a sleep state; and perform the at least one sleep/wake-up action.

16. The apparatus of claim 15, wherein the processor is further configured to execute the instructions to cause the apparatus to obtain, based on a mapping relationship, a unified sleep/wake-up signal corresponding to any one of the at least one first sleep/wake-up signal, and wherein the first mapping relationship is between the at least one first sleep/wake-up signal and the unified sleep/wake-up signal.

17. The apparatus of claim 15, wherein the processor is further configured to execute the instructions to cause the apparatus to:

obtain, based on a mapping relationship, static control targets corresponding to the at least one unified sleep/wake-up signal, wherein the mapping relationship is between the unified sleep/wake-up signal and the at least one in-vehicle object; and merge the static control targets to obtain the at least one static control target.

18. The apparatus of claim 15, wherein the processor is further configured to execute the instructions to cause the apparatus to:

obtain, based on a mapping relationship, the at least one vehicle integration controller corresponding to the at least one static control target, and the at least one in-vehicle object on which sleep/wake-up control is to be performed and that is in the at least one vehicle integration controller, wherein mapping relationship is among the at least one static control target, the at least one vehicle integration controller, and the at least one in-vehicle object; and obtain the at least one sleep/wake-up action based on whether the at least one in-vehicle object is currently in an awake state or the sleep state.

19. The apparatus of claim 15, wherein the at least one first sleep/wake-up signal comprises a first signal for waking up the at least one in-vehicle object or a second signal for controlling the at least one in-vehicle object to enter the sleep state, and wherein the processor is further configured to execute the instructions to cause the apparatus to:

obtain the first signal when receiving a network management packet or a service packet; and obtain the second signal when the network management packet or the service packet is not received within a preset time.

20. The apparatus of claim 15, wherein the at least one first sleep/wake-up signal comprises a first signal for waking up the at least one in-vehicle object or a second signal for controlling the at least one in-vehicle object to enter the sleep state, and wherein the processor is further configured to execute the instructions to cause the apparatus to:

obtain the first signal when detecting a first level change; and obtain the second signal when detecting a second level change.

* * * * *